(12) United States Patent
Solorio et al.

(10) Patent No.: US 12,002,941 B2
(45) Date of Patent: Jun. 4, 2024

(54) CONTROL OF ELECTROLYTE INSIDE BATTERY

(71) Applicant: HUNT ENERGY ENTERPRISES, L.L.C., Dallas, TX (US)

(72) Inventors: Nestor Pimentel Solorio, Dallas, TX (US); Denyce Alvarez, Carrollton, TX (US); Fantai Kong, McKinney, TX (US)

(73) Assignee: Hunt Energy Enterprises, L.L.C., Dallas, TX (US)

(*) Notice: Subject to any disclaimer, the term of this patent is extended or adjusted under 35 U.S.C. 154(b) by 0 days.

(21) Appl. No.: 17/982,392

(22) Filed: Nov. 7, 2022

(65) Prior Publication Data

US 2023/0144194 A1    May 11, 2023

Related U.S. Application Data

(60) Provisional application No. 63/276,915, filed on Nov. 8, 2021.

(51) Int. Cl.
| | |
|---|---|
| *H01M 12/08* | (2006.01) |
| *H01M 4/134* | (2010.01) |
| *H01M 4/66* | (2006.01) |
| *H01M 4/80* | (2006.01) |
| *H01M 8/04276* | (2016.01) |

(Continued)

(52) U.S. Cl.
CPC ......... *H01M 12/085* (2013.01); *H01M 4/134* (2013.01); *H01M 4/661* (2013.01); *H01M 4/808* (2013.01); *H01M 8/04276* (2013.01); *H01M 8/188* (2013.01); *H01M 10/365* (2013.01); *H01M 2300/0002* (2013.01)

(58) Field of Classification Search
CPC ........... H01M 12/085; H01M 8/04276; H01M 8/188; H01M 10/365; H01M 2300/0002
See application file for complete search history.

(56) References Cited

U.S. PATENT DOCUMENTS

| | | | |
|---|---|---|---|
| 10,938,073 B2* | 3/2021 | Inokuchi | ............... H01M 12/06 |
| 2007/0221265 A1 | 9/2007 | Affinito et al. | |
| 2010/0124691 A1 | 5/2010 | Harris | |

(Continued)

FOREIGN PATENT DOCUMENTS

| | | |
|---|---|---|
| CN | 112599941 A | 4/2021 |
| CN | 213660463 U | 7/2021 |

(Continued)

OTHER PUBLICATIONS

Non-Final Office Action in U.S. Appl. No. 17/982,379 dated Feb. 14, 2023, 17 pages.

(Continued)

*Primary Examiner* — Stewart A Fraser
(74) *Attorney, Agent, or Firm* — Patent Capital Group

(57) ABSTRACT

Particular embodiments described herein provide for a privacy cover in an electronic device. The battery system can be configured to monitoring one or more condition of a battery using a battery electrolyte controller that is separate from the battery, adjusting one or more properties of an electrolyte in an electrolyte conduit, where the electrolyte conduit is coupled to an inlet and an outlet on the battery, and activating a pump to move the electrolyte with the adjusted one or more properties into the battery.

6 Claims, 28 Drawing Sheets

(51) Int. Cl.
*H01M 8/18* (2006.01)
*H01M 10/36* (2010.01)

(56) References Cited

U.S. PATENT DOCUMENTS

| | | |
|---|---|---|
| 2010/0129699 A1 | 5/2010 | Mikhaylik et al. |
| 2010/0291442 A1 | 11/2010 | Wang et al. |
| 2012/0021303 A1* | 1/2012 | Amendola ............ H01M 12/08 429/406 |
| 2013/0141050 A1* | 6/2013 | Visco ................... H01M 8/188 429/535 |
| 2014/0315049 A1 | 10/2014 | Wegner et al. |
| 2015/0072236 A1 | 3/2015 | Um et al. |
| 2016/0308234 A1* | 10/2016 | Reece ................. H01M 8/0202 |
| 2019/0043636 A1 | 2/2019 | Koenig, Jr. et al. |
| 2019/0181492 A1 | 6/2019 | Liu et al. |
| 2019/0355960 A1 | 11/2019 | Hong et al. |
| 2020/0189401 A1* | 6/2020 | Funakoshi ......... G01C 21/3476 |
| 2022/0069286 A1 | 3/2022 | Huang et al. |
| 2022/0149416 A1* | 5/2022 | Sinclair ................ H01M 8/249 |

FOREIGN PATENT DOCUMENTS

| | | |
|---|---|---|
| JP | 2019061784 A | 4/2019 |
| JP | 2020170857 A | 10/2020 |
| WO | 2013109641 A1 | 7/2013 |
| WO | 2020230166 A1 | 11/2020 |

OTHER PUBLICATIONS

Korean IP Office, International Search Report and Written Opinion dated Mar. 3, 2023 in PCT/US2022/049173, 12 pages.
Korean IP Office, International Search Report and Written Opinion dated Feb. 28, 2023 in PCT/US2022/049172, 13 pages.
Non-Final Office Action in U.S. Appl. No. 17/982,379 dated Jun. 5, 2023, 19 pages.

* cited by examiner

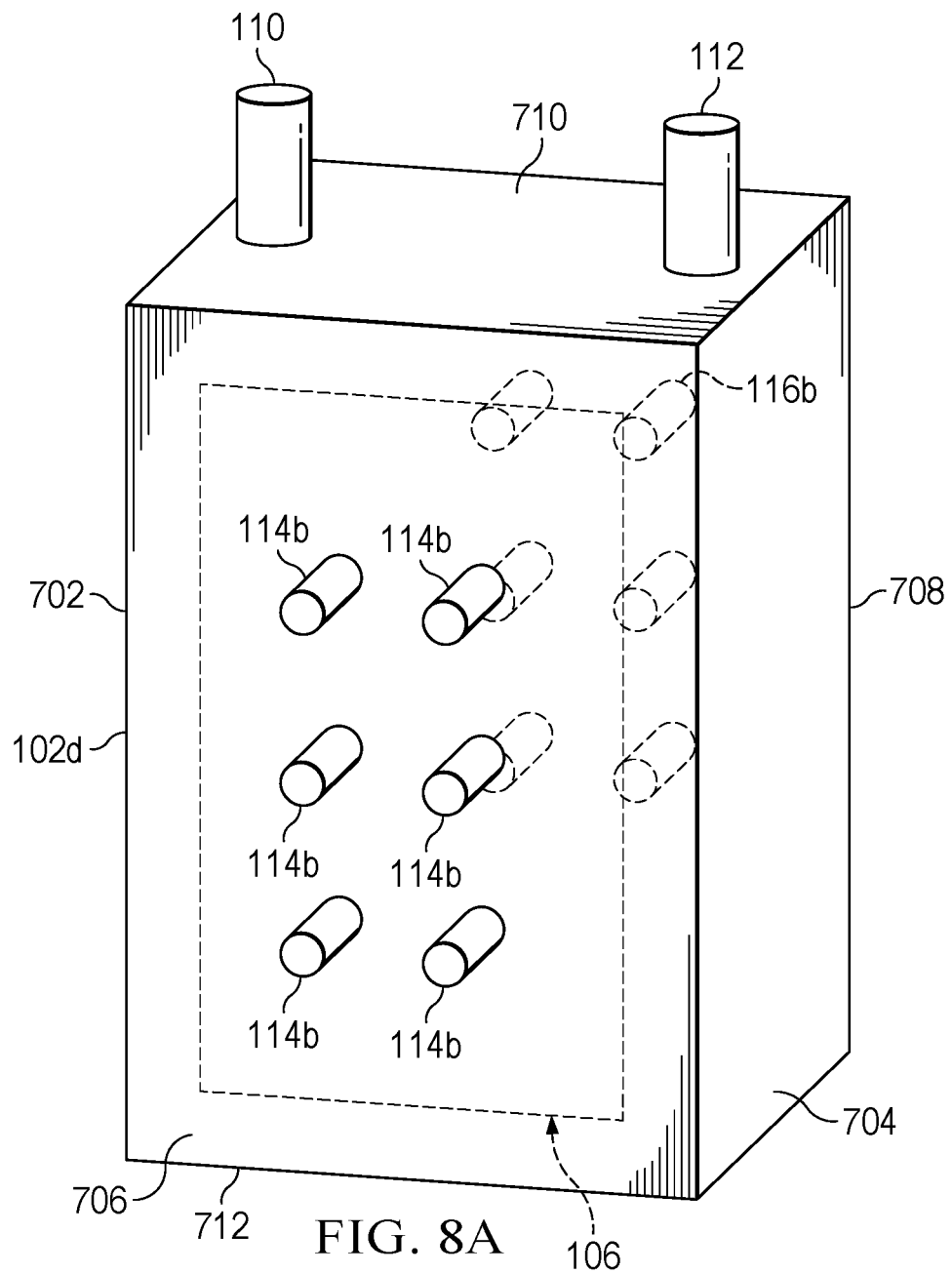

CONTROL OF ELECTROLYTE INSIDE BATTERY

CROSS REFERENCE TO RELATED APPLICATION

This application claims priority to U.S. Provisional Application No. 63/276,915 filed Nov. 8, 2021 entitled "ELECTROLYTE CONTROL SYSTEM AND BATTERY CELL STRUCTURE," the contents of which is hereby incorporated by reference

TECHNICAL FIELD

This disclosure relates in general to the field of energy storage devices, and more particularly, to a battery for electrical energy storage.

BACKGROUND

A battery is a collection of one or more cells that store electrical energy and is capable of using the stored electrical energy to supply electric power. The cell is a basic electrochemical unit that handles the actual storage of the energy in the battery. The cell includes three main components; at least two electrodes and an electrolyte. The two electrodes are an anode, the negative electrode, and a cathode, the positive electrode.

When the anode loses electrons to an external circuit, the anode becomes oxidized. The anode can also be called the fuel electrode or the reducing electrode. Once the cathode accepts electrons from the internal circuit, the cathode gets reduced. The cathode can also be called the oxidizing electrode. The electrolyte acts as the medium for transferring charge in the form of ions between the two electrodes. Generally, the electrolyte is not electrically conductive but is ionic conductive and is often referred to as an ionic conductor. The chemical reactions create the flow of electrons within a circuit. The stored chemical energy is then converted into direct current electric energy.

There are two main types of batteries, a primary battery and a secondary battery. Primary batteries cannot be recharged and are often a power source for portable electronics and devices. Primary batteries can only be used once and cannot be recharged. Most primary batteries are single cell batteries with one anode and one cathode. Secondary batteries can be recharged and are often used as energy storage devices and where the battery is used as a primary battery then recharged and used again as a primary battery. Secondary batteries can be a single cell battery with one anode and one cathode or a multiple cell battery with a plurality of anodes and cathodes.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 8A and 8B are simplified block diagrams illustrating example details of a portion of a system to help enable control of an electrolyte inside a battery, in accordance with an embodiment of the present disclosure;

Figure 1:
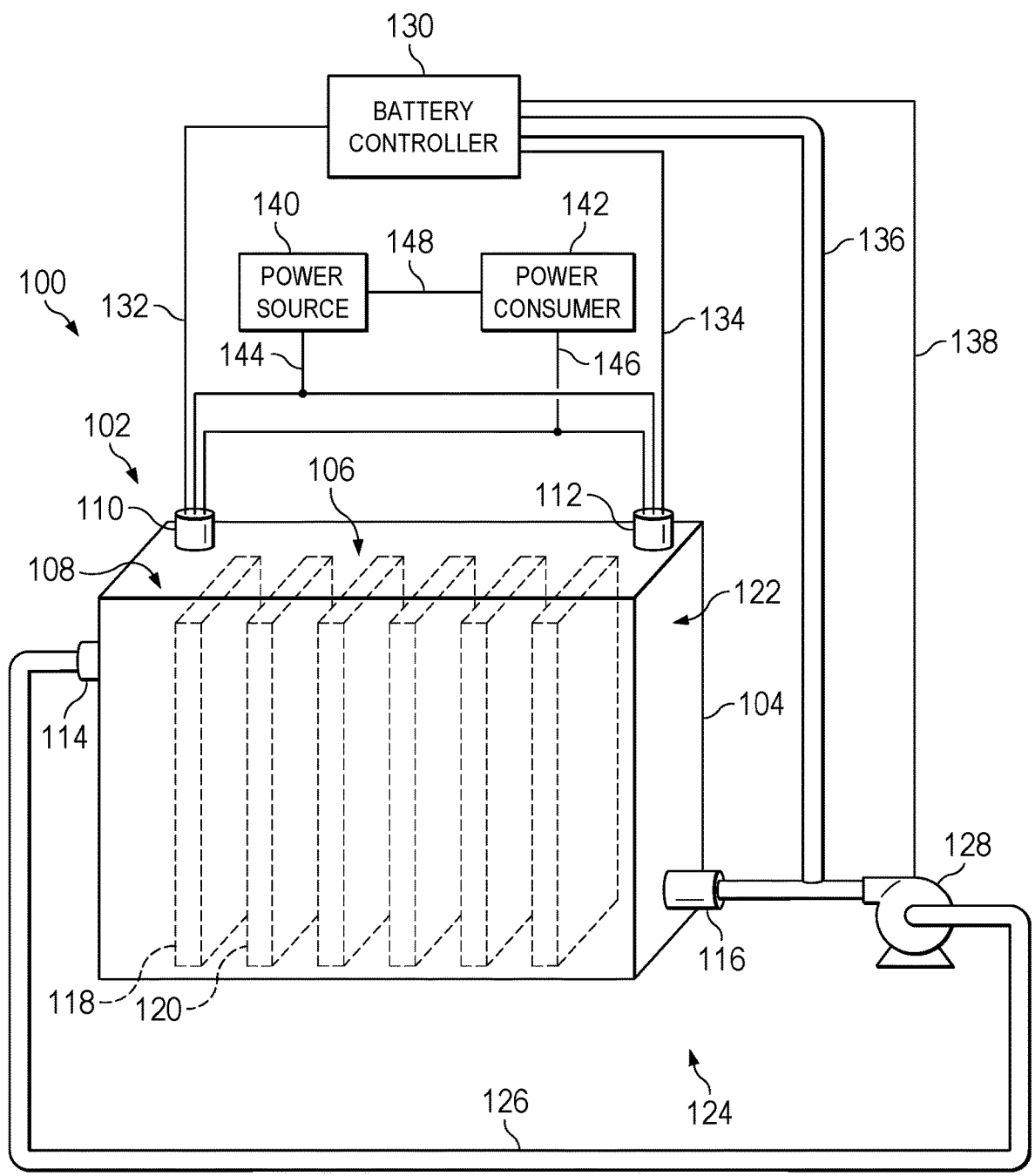
FIG. 1 is a simplified block diagram of a system to enable control of an electrolyte inside a battery, in accordance with an embodiment of the present disclosure.

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling a composite electrode structure in accordance with an embodiment of the present disclosure. Features such as structure(s), function(s), and/or characteristic(s), for example, are described with reference to one embodiment as a matter of convenience; various embodiments may be implemented with any suitable one or more of the described features.

Overview

In an example, a battery system can allow for real-time adjustment of the electrolyte flow rate, the electrolyte level in the battery, the pH value of the electrolyte in the battery, and the salt concentrations of the electrolyte in the battery. The battery system can be configured to read information from battery cells including voltage, current, capacity, energy and time to adjust the flow rate, liquid level, pH value, and salt concentrations. The system can be integrated with one or more battery cells, one or more battery modules, and/or one or more battery packs. The battery cell structure can include tube inlets and outlets to provided to accommodate the electrolyte control system and enable different types of flow patterns. Moreover, the electrode structures are also provided that enable both high electrical and ionic conductivities by combining a manifold with an electrode substrate for improved battery performance and flow controllability as compared to a battery without the manifold The battery system can a plurality of electrodes, the electrolyte, at least one inlet, and at least one outlet. An electrolyte conduit can be coupled to the at least one inlet and the at least one outlet. A pump can be coupled to the electrolyte conduit to move the electrolyte through the electrolyte conduit. A battery electrolyte controller is coupled to the electrolyte conduit and the pump and the battery electrolyte controller can add electrolyte to the electrolyte conduit and material (e.g., pH adjustment material, salt concentration material) and can activate the pump to push the added electrolyte and added material in the electrolyte conduit to the battery to help enable control of an electrolyte inside the battery.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus twenty percent (±20%) variation. For example, about one (1) millimeter (mm) would include one (1) mm and ±0.2 mm from one (1) mm. Similarly, terms indicating orientation of various elements, for example, "coplanar," "perpendicular," "orthogonal," "parallel," or any other angle between the elements generally refer to being within plus or minus five to twenty percent (+/−5-20%) of a target value based on the context of a particular value as described herein or as known in the art.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one example" or "an example" in the present disclosure means that a particular feature, structure, or characteristic described in connection with the embodiment is included in at least one example or embodiment. The appearances of the phrase "in one example" or "in an example" are not necessarily all referring to the same examples or embodiments.

Example Battery and Electrode

FIG. 1 is simplified block diagram of a battery system 100, in accordance with an embodiment of the present disclosure. The battery system 100 can include a battery 102, an electrolyte conduit 126, a pump 128, and a battery electrolyte controller 130. In an example, the battery 102 can include an outer casing 104, a plurality of electrodes 106, an electrolyte 108, a positive terminal 110, a negative terminal 112, an inlet 114, and an outlet 116. The plurality of electrodes 106 include at least one anode 118 and at least one cathode 120. The battery 102 can be an aqueous rechargeable battery (ARB).

The outer casing 104 defines an interior space 122 inside the battery 102. The interior space 122 includes the plurality of electrodes 106 (the least one anode 118 and the at least one cathode 120) and the electrolyte 108 and helps keep the plurality of electrodes 106 and the electrolyte 108 from being exposed to an outside environment 124. The outside environment 124 is the environment around the battery 102 or the environment outside of the outer casing 104. The positive terminal 110 and the negative terminal 112 extend from the outer casing 104 into the outside environment 124. The inlet 114 and the outlet 116 also extend from the outer casing 104 into the outside environment 124. An electrolyte conduit 126 can extend from the outlet 116, to a pump 128, and to the inlet 114. The pump 128 can help circulate the electrolyte 108 through the electrolyte conduit 126.

A battery electrolyte controller 130 can monitor conditions of the battery (e.g., voltage, current, capacity, etc.) and allow for real-time adjustment of the electrolyte flow rate, electrolyte level in the battery, the pH value of the electrolyte in the battery, and the salt concentrations of the electrolyte in the battery. The battery electrolyte controller 130 can be connected to the positive terminal 110 using a positive terminal communication channel 132 and to the negative terminal 112 using a negative terminal communication channel 134. The battery electrolyte controller 130 can also be connected to the pump 128 using a pump communication channel 138. In addition, the battery electrolyte controller 130 can be coupled to the electrolyte conduit 126 using a battery control electrolyte conduit 136.

The battery 102 can be a standby power system and can be connected to a power source 140 using a battery charging channel 144. The power source 140 can be a windfarm, solar farm, power gride, or some other type of system that can supply power to the battery 102 and recharge the battery. The battery can also be connected to a power consumer 142 using a battery power supply channel 146. The power consumer 142 consumes power from the battery 102. The power consumer 142 can be a power grid that supplies power to a power consumer, a house, building, work equipment, or some other type of device that consumes power. The power source 140 can also be connected to the power consumer 142 using power supply channel 148.

The battery system 100 can help enable electrolyte control that enables real-time adjustment or about real-time adjustment of the electrolyte flow rate, the liquid level, the pH value, and the salt concentrations of the electrolyte in the battery. The battery electrolyte controller 130 can be configured to read information from battery cells including voltage, current, capacity, energy and time to adjust the optimal flow rate, flow duration, flow frequency, liquid level, pH value, salt species and salt concentrations, etc. The battery system 100 can be integrated with one or more battery cells, one or more battery modules, and/or one or more battery packs.

It is to be understood that other embodiments may be utilized and structural changes may be made without departing from the scope of the present disclosure. Substantial flexibility is provided by the privacy cover, the electronic device, and/or the display in that any suitable arrangements and configuration may be provided without departing from the teachings of the present disclosure.

For purposes of illustrating certain example techniques of the battery system 100, the following foundational information may be viewed as a basis from which the present disclosure may be properly explained. A number of prominent technological trends are currently afoot and these trends are changing the power delivery landscape. The growing energy demands and the increasing environmental concerns drive the transformation of power generation from primarily fossil and nuclear sources to solely renewable energy sources and the search of efficient energy management systems (conversation, storage and delivery), to achieve a secure, reliable and sustainable energy supply. The success is strongly dependent on the achievements in efficient electrochemical power sources that are also safe to operate, economically viable, and environmentally friendly. One type of reliable and sustainable energy supply is a rechargeable battery that can delivery electrical power when needed and then recharge so the battery is available to provide the electrical power the next time it is needed.

As renewable energy sources such as wind and solar are becoming much more prevalent in the supply of electrical power to transmission grids, their variable nature to produce electrical power has created electrical transmission grid management problems and crippling downward pricing pressure on renewable power generators. Large scale energy storage is a potential solution to these problems, but the scale and attendant costs can be relatively large. As an example, in a single hour, one wind turbine can fully charge ten of the largest capacity electric automobile battery piles currently available. These automobile battery piles represent over ten tons of highly engineered and expensive materials for merely one hour of electric service. With the growing energy demands and the increasing environmental concerns driving the transformation of power generation from primarily fossil and nuclear sources to solely renewable energy sources, a search of efficient energy management systems (conversation, storage and delivery), to achieve a secure, reliable and sustainable energy supply is underway. One type of energy supply that can be used is a rechargeable battery.

A battery is a device that stores chemical energy, and converts the chemical energy to electricity. This is known as electrochemistry and the system that underpins a battery is called an electrochemical cell. A battery can be made up of one or several electrochemical cells. Each electrochemical cell consists of two electrodes; an anode and a cathode, separated by an electrolyte.

The battery includes chemicals that undergo a reaction, a reduction-oxidation reaction or more commonly a redox reaction, that involves the exchange of electrons. More specifically, two half-reactions occur, and in the case of an electrochemical cell, one half-of the reaction occurs at the anode, the other half of the reaction occurs at the cathode. At the anode, the electrode that functions as the anode reacts with the electrolyte in a reaction that produces electrons and the electrons accumulate at the anode. At the cathode, a simultaneous chemical reaction occurs that enables that electrode that functions as the cathode to accept electrons. Reduction is the gain of electrons, and is what occurs at the cathode where the cathode is reduced during the reaction. Oxidation is the loss of electrons, so the anode is oxidized.

Any two conducting materials that have reactions with different standard potentials can form an electrochemical cell because the stronger one (the cathode) will be able to take electrons from the weaker one (the anode). A good choice for an anode would be a material that produces a reaction with a significantly lower (more negative) standard potential than the material that is chosen for the cathode. This allows electrons being attracted to the cathode from the anode, and when provided with an easy pathway for the electrons to travel from the anode to the cathode (e.g., a conducting wire), the flow of the electrons can provide electrical power.

Electrons have a negative charge, and because the flow of negative electrons travels around through the circuit, the flow or movement of the negative charge needs to be balanced by positive ions. The electrolyte provides a medium through which charge-balancing positive ions can flow. As the chemical reaction at the anode produces electrons, to maintain a neutral charge balance on the electrode, a matching amount of positively charged ions are also produced. The positively charged ions do not travel to the external wire but are released into the electrolyte. While the external wire provides the pathway for the flow of negatively charged electrons, the electrolyte provides the pathway for the transfer of positively charged ions to balance the negative flow. This flow of positively charged ions is just as important as the electrons that provide the electric current in the external circuit used to power devices. The charge balancing is necessary to keep the entire reaction in the battery running.

When a rechargeable battery that does not have a charge or is not fully charged is connected to an external electricity source and energy is sent back in to the battery, the energy into the battery reverses the chemical reaction that occurred during discharge. This sends the positive ions released from the anode into the electrolyte back to the anode and the electrons that the cathode took in also back to the anode. The return of both the positive ions and electrons back into the anode primes the system and the battery is recharged.

Even though lithium (Li) ion batteries are the major rechargeable battery technology applied to electronic vehicle applications, supplies of critical metals (e.g., lithium (Li), nickel (Ni), and cobalt (Co)) are already creating concerns on the future growth of electronic vehicle fleets. Even larger scale energy storage applications are needed for grid scale energy storage which will enable the intermittent generation from solar and wind power sources to supply steady electricity over the power grid. To achieve such long-term energy storage goals, it would be important to develop energy storage system composed of earth abundant elements and nonflammable materials. For example, zinc (Zn), hydrogen (H), manganese (Mn), and oxygen (O) are very abundant elements in the earth crust and atmosphere, and these elements can be combined to operate at aqueous zinc (Zn) ion battery without any practical limitations of critical metals currently used in lithium (Li) ion batteries. However, energy storage requires over 5000 cycling stability at durations of 1 hour to 10 hours scopes and conventional zinc (Zn) ion batteries normally cannot achieve such stability with low capital or operational costs.

The success of renewable energy sources is strongly dependent on the achievements in efficient electrochemical power sources that are also safe to operate, economically viable, and environmentally friendly. Rechargeable battery technologies including lead-acid (Pb-acid), nickel-cadmium (Ni—Cd), nickel-metal hydride (Ni-MH), redox flow-cells (RFCs) and lithium-ion batteries (LIBs) have found practical applications in various areas, however, the inherent limitations of these systems impede their applications in large-scale energy storage. In in large-scale energy storage, operational safety is of prime importance along with other desirable characteristics such as low installed cost, long cycling life, high energy efficiency and sustainability. For example, the Pb-acid batteries and Ni—Cd batteries generally suffer from a limited energy density (~30 Wh kg−1), in addition to the employment of environmentally threatened electrode materials. The nickel-iron battery is challenged by the poor charge/discharge efficiency (ca. 50-60%) and the self-discharge (20-40% per month) related to the corrosion and poisoning of the iron anode. The Ni-MH possesses higher energy density, but delivers poor low-temperature capability, limited high-rate capability, and poor Coulombic efficiency. Redox-flow cells can be easily piled up, however, the relatively low power/energy density and the special heat/temperature control requirements limit their application. Lithium-ion batteries hold great promise, benefiting from higher energy density, lighter weight and longer life time. However, incidents caused by the flammability of the organic electrolyte and the reactivity of the electrode materials with the organic electrolytes in the case of overcharging or short-circuiting raises serious safety concerns. In addition, the lithium-ion battery technologies have a comparatively high cost due to the materials used (organic lithium (Li) salts and organic electrolytes), the special cell design and manufacturing processes, and auxiliary systems required for their operation. Another challenge regarding lithium-ion batteries is the limited rate capability and specific power that are restricted by the limited ionic conductivities of the organic electrolyte. What is needed is a battery system that is relatively safe to operate, relatively economically viable, and relatively environmentally friendly.

A system, method, apparatus, means, etc. to enable a battery system that is relatively safe to operate, relatively economically viable, and relatively environmentally friendly can help resolve these issues (and others). In an example, a battery system (e.g., the battery system 100) can include a battery (e.g., the battery 102), an electrolyte conduit (e.g., the electrolyte conduit) 126, a pump (e.g., the pump 128), and a battery electrolyte controller (e.g., the battery electrolyte controller 130). The battery can include a plurality of electrodes (e.g., the plurality of electrodes 106), an electrolyte (e.g., the electrolyte 108), a positive terminal (e.g., the positive terminal 110), a negative terminal (e.g., the negative terminal 112), at least one inlet (e.g., the inlet 114), and at least one outlet (e.g., the outlet 116). The plurality of electrodes includes at least one anode (e.g., the at least one anode 118) and at least one cathode (e.g., the at least one cathode 120).

The control system for the battery can include a pump controller, a liquid level controller, a pH controller, a salt species and concentration controller, and/or battery-controller interface components. In some examples, the battery control system can independently control multiple cells in the battery as well as independently control multiple batteries. The battery electrolyte controller can read the real-time information from the battery (using the anode and the cathode) including voltage, current, capacity, energy, etc., and use the real time information to control different controllers. The pump controller is capable of tuning the flow rate, the flow pressure and the flow time of the electrolyte depending on the battery condition. In an example, valves controlling each single cell in a multiple cell battery can be independently opened and closed or tuned by the battery electrolyte controller depending on each cell status.

In some examples, a liquid level controller is able to measure the remaining electrolyte amount in each cell of the battery. A refill tank of water or electrolyte can be used by the battery electrolyte controller to adjust the liquid level of the electrolyte inside the battery. The pH controller consists of a pH meter to track the real-time pH value of the electrolyte. A reservoir of acid or basic agents can be used by the battery electrolyte controller to tune the desired pH value of the electrolyte inside the battery. A solid salt or salt solution reservoir can be used by the battery electrolyte controller to adjust the salt concentration of the electrolyte of the electrolyte inside the battery. When a targeted salt concentration for the battery is below a threshold, the battery electrolyte controller can add needed salt into the electrolyte to tune the ion concentration of the electrolyte inside the battery. The battery electrolyte controller can tune the salt concentration based on a voltage profile for the battery. The pump is used to circulate the electrolyte. Through circulation, the kinetics of ions in the electrolyte that are involved in the chemical reaction are increased, which can lead to increased battery performance as compared to a battery that does not have circulation of the electrolyte.

In some examples, the battery can include a plurality of inlets and a plurality of outlets coupled to the battery to allow connection with one or more circulation pumps. The inlets and outlets can be located on two sides, four sides, or all sides of the battery. The number of inlets and outlets depends on the battery cell size and capacity. Within the battery, electrolyte flow direction affects the flow effect on battery performance. The location of the inlets and the outlets enables multiple different types of flow directions or patterns. For example, the flow direction of the electrolyte can be parallel and/or perpendicular to the electrodes in the battery. More specifically, relative to the electrodes, the flow direction of the electrolyte can be parallel-in and parallel-out from the battery cell sides. The flow direction of the electrolyte, relative to the electrodes, can also be perpendicular-in and perpendicular-out from the battery cell sides. The flow direction of the electrolyte, relative to the electrodes, can also be parallel-in and parallel-out from the top and the bottom of the battery cell sides. The term "top" means the side of the battery with the battery terminal installation (e.g., the positive terminal 110 and the negative terminal 112) and the term "bottom" is the side opposite to the top. The flow direction of the electrolyte, relative to the electrodes, can also be perpendicular-in and parallel-out from all the battery cell sides. The flow direction of the electrolyte, relative to the electrodes, can also be parallel-in and perpendicular-out from all the battery cell sides. The flow direction of the electrolyte, relative to the electrodes, can also be parallel-in and parallel-out from battery cell side and top or bottom. Both parallel and perpendicular flow directions are relative to the electrode plate faces.

In some examples, a mechanical pump can be used to circulate the electrolyte. In other examples the electrolyte, especially the ions inside the electrolyte, can be controlled by combining the battery cell with a field generator. The field generator can generate a desired electric field, magnetic field, or a thermal or temperature field which can alter the kinetics of ions within the electrolyte through a contactless method. The field generator is connected to a control system that can tune the field strength and direction of the electrolyte according to real-time battery performance information.

The battery can be an aqueous rechargeable battery with a water based electrolyte. Water based electrolytes enable very high ionic conductivity, and are particularly suited for high power density batteries. Also, aqueous rechargeable batteries are particularly suited for large-scale energy storage in terms of safety, economics, and sustainability. More specifically, aqueous rechargeable batteries are inherently safe because the aqueous electrolyte does not require the usage of flammable organic electrolytes. Also, the ionic conductivities of the aqueous electrolyte is about two orders of magnitude higher than that of nonaqueous electrolytes, ensuring relatively fast charge and discharge and high round-trip efficiency as compared to nonaqueous electrolytes. Further, the electrolyte salt and solvent in the aqueous electrolyte are typically less expensive as compared to nonaqueous electrolytes and the rigorous manufacturing requirements of nonaqueous electrolytes are avoided. In addition, the aqueous electrolyte is generally environmentally benign.

The first aqueous rechargeable batteries used $LiMn_2O_4$ as the positive electrode and $\beta$-$VO_2$ and the negative electrode. In the first aqueous rechargeable batteries, metal-ions were intercalated into or extracted from the active materials upon charge/discharge processes, similar to that of organic systems and currently is often referred as "rocking chair" type aqueous rechargeable batteries or "intercalation-chemistry" type aqueous rechargeable batteries. Since then, significant progresses have been made as more electrochemical redox couples are identified, more insights into fundamental chemistry are gained, and new battery chemistries are explored. More recently, a hybrid design via coupling an intercalation cathode with a metal anode or combining an intercalation anode with a metal oxides/sulphide has been introduced in aqueous rechargeable batteries with the appearance of a new class of aqueous hybrid batteries systems such as $LiMn_2O_4$//Zn, $Na_{0.44}MnO_2$//Zn, $Na_{0.61}Fe_{1.94}(CN)_6$, $Ni(OH)_2$//$TiO_2$, $Co_xNi_{2-x}S_2$//$TiO_2$, and, $MnO_2$//Zn. Different from the "rocking chair" type aqueous rechargeable batteries, the new class of aqueous rechargeable batteries operate based on two reversible electrochemical redox processes involving the anode and cathode electrodes separately and the charge/discharge mechanism in one or two electrodes is not guest ion intercalation/deintercalation. Instead, the reversible electrochemical redox processes can be the reaction of $Zn^{2+}$ deposition-dissolution and/or proton-induced oxidization/reduction. The electrolyte in the new class of aqueous rechargeable batteries acts as conducting ions and cooperates with the electrodes to store energy, rather than used as the simple supporting media in "rocking chair" type aqueous rechargeable batteries.

Since electrochemical redox reactions involved in an aqueous rechargeable battery take place in a water environment, the electrochemical stability window is generally limited to be 1.23 V, beyond which $H_2O$ is electrolyzed with $O_2$ or $H_2$ gas evolution. Thus, materials with working potentials located between the $H_2$ evolution potential and $O_2$ evolution potential are promising electrode candidates for aqueous rechargeable batteries. In principle, electrodes with a working potential between 3 and 4 V (vs. $Li^+/Li$) can be used as a cathode and electrodes with a working potential between 2 and 3 V (vs. $Li^+/Li$) can be used as an anode. It should be noted that the $H_2$ evolution potential and $O_2$ evolution potential are strongly dependent on pH value and special caution should be given for electrode materials selection to avoid water decomposition. The electrochemical stability window limits the achievable energy density as energy per electron contains is much lower than non-aqueous battery, for example, lithium (Li) ion battery has a voltage window above 3.5 V. Therefore, it is critical for aqueous rechargeable battery to obtain high areal capacity to improve the overall energy density.

Rechargeable batteries based on multivalent metal ions insertion/extraction in an aqueous solution, such as $Mg^{2+}$, $Ca^{2+}$, $Zn^{2+}$, and $Al^{3+}$, are considered to be one of the most promising aqueous rechargeable battery systems due to potential two-to-three-fold high energy density as compared to monovalent aqueous rechargeable batteries. The water molecules can effectively shield the electrostatic repulsion of multivalent ions and lower the activation energy for charge transfer at the electrode/electrolyte interface as compared to an organic solution. Thus, the multivalent aqueous rechargeable batteries can often deliver better electrochemical properties than organic rechargeable batteries.

Metallic zinc (Zn) is a promising anode candidate for aqueous batteries because of its low equilibrium potential (−0.762 V vs. SHE), high specific energy density (825 mAh g-1), and abundance and low toxicity. Different from the "rocking chair" type batteries, exchange of Li+ and Zn2+ ions in a mild acidic aqueous electrolyte occurs upon charging/discharging. The electrolyte acts as conducting ions and cooperates with the electrodes to store energy, rather than as the simple supporting media in "rocking chair" type batteries. The electrochemical reaction between the $LiMn_2O_4$ cathode and zinc (Zn) metal anode can be expressed as follows:

$$Zn_xMnO_2 \leftrightarrow Zn_{x-y}MnO_2 + yZn^{2+} + 2ye^-$$

$$Zn^{2+} + 2e^- \leftrightarrow Zn$$

In some examples, adding carbon additives into a porous zinc (Zn) anode can help to improve the discharge capacity as well as the cycling stability of the zinc (Zn) anode. The improvement can be attributed to the carbon coating of the zinc (Zn) particle surface that help to prevent the direct contact of the zinc (Zn) anode with the electrolyte, and thus the corrosion of the active zinc (Zn) particle is restrained. In addition, the pores of activated carbon can accommodate the deposition of zinc (Zn) dendrites and insoluble anodic products, giving an increase in cycling stability. Organic additives can also be added to help suppress the dendrite formation and corrosion of zinc (Zn) anode upon cycling.

In a specific example, the battery electrolyte controller can be used to create a controllable capacity regeneration reaction in the battery. The capacity regeneration reaction is mainly applied to the cathode to address the well-known instability challenge of manganese (Mn)-based materials. For example, an energy storage reaction can happen at a cathode in a zinc (Zn) ion battery using manganese oxides as the cathode materials following work reactions on the cathode side: $xZn^{2+} + MnO_2 + 2xe^- \leftrightarrow Zn_xMnO_2$, $yH^+ + MnO_2 + ye^- \leftrightarrow H_yMnO_2$, $Mn^{2+} + 2H_2O \leftrightarrow MnO_2 + 4H^+ + 2e^-$; and on the anode side: $Zn \leftrightarrow Zn^{2+} + 2e^-$. An example of the capacity regeneration reaction is expressed as: $Mn^{2+} + 2H_2O \rightarrow MnO_2 + 4H^+ + 2e^-$. The electrolyte can be a mild-acidic aqueous solution with pH range of about 4 to about 7. In some examples, the electrolyte contains 0.5M to 3M $ZnSO4$ and 0.1M to 1.0M $MnSO4$. As seen from the reaction, extra $MnO_2$ can be regenerated to function as fresh cathode materials and provide the required capacity. In some examples, the capacity regeneration reaction requires consumption of manganese (Mn) salts. The circulation of the electrolyte may help to increase the performance of the battery with higher battery kinetics, promoted $MnO_2$ reversible conversion and suppressed battery side reactions. These side reactions may, in turn, increase the electrode resistance and lead to greater need for capacity regeneration reaction and associated manganese (Mn) salt consumption. With the integration of electrolyte circulation and adjustment of the conditions in the battery and the electrolyte by the battery controller, in-situ battery regeneration can be used to regenerate battery performance in a low-cost way, and enable the recycling of zinc (Zn) and manganese (Mn) salts.

In an illustrative example, the battery can include a plate-type cathode and anode separated by a spacer or separator, composed of filter paper, fiberglass paper, fiber cloths, polyethylene separator, plastic mesh and their combinations. Current collectors may use carbon paper, carbon cloth, carbon felt, carbon foil, carbon foam, conductive polymers, metal sheet, metal mesh, metal foam, wherein metal includes zinc, nickel, carbon steel, chromium, copper, aluminum, stainless steel, and their combinations. The current collector may be coated with electrically conductive materials, such as carbon black, conductive graphite, carbon nanotube, activated carbon, amorphous carbon, conductive polymer, metal particle such as zinc, nickel, chromium, copper, aluminum, stainless steel, etc. To help obtain a good coating effect, the coating materials may mix with polymer binders such as Polyvinylidene fluoride (PVDF), Polytetrafluoroethylene (PTFE), Polyvinyl butyral (PVB), Carboxymethyl cellulose (CMC), Styrene-Butadiene Rubber (SBR), Poly(ethylene oxide) (PEO), in solvents such as N-Methyl-2-Pyrrolidone (NMP), ethanol, acetone, and water. The resulted slurry may be applied onto a current collector through methods such as brush painting, spin coating, blade coating, dip-coating to improve electronic conductivity. The cathode electrode materials can include manganese oxide, nickel oxide, zinc oxide, magnesium oxide, calcium oxide, or vanadium oxide. The anode electrode materials can include zinc, aluminum, nickel, lead, magnesium, boron, cobalt, titanium, chromium, vanadium, graphite, activated carbon, hard carbon, or sodium vanadium phosphate. The electrolyte within the battery can include an aqueous or organic solution composed of cations such as $Zn^{2+}$, $Mn^{2+}$, proton, $Al^{3+}$, $Na^+$, $K^+$, $Mg^{2+}$, $Ni^{2+}$, $Cu^{2+}$, $Fe^{3+}$, $Co^{2+}$, $Ca^{2+}$, $NH_4^+$, etc. and anions such as $PO_4^{3-}$, $SO_4^{2-}$, $CH_3COO^-$, $Cl^-$, $F^-$, $Br^-$, $NO_3^-$, etc. The electrolyte may also include polymer additives selected from the group consisting of ionomers, pyrrole, aniline, carbonate, vinyl acetate, ethylene glycol, and methyl methacrylate. Between the electrodes is the separator which comprises one or more of filter paper, fiberglass paper, fiber cloths, cellulose, wood fibers, polyethylene separator, and plastic mesh.

In some examples, electrolyte circulation is enabled by pumping or controlled electrolyte flow methods using one or more inlets and the pump. The circulation can help enhance the kinetics of the electrolyte to both improve the battery performance and help achieve a high areal capacity as compared to batteries with no electrolyte circulation. In certain examples, the electrolyte circulation may also suppress side reactions at the electrolyte-electrode interface to help increases the battery performances, as compared to batteries with no electrolyte circulation. With an example zinc (Zn) ion battery, where the anode is zinc (Zn) metal, the cathode is $MnO2$, and the electrolyte is a mixed solution including $ZnSO4$-$MnSO4$, during charging/discharging process, a layer of zinc hydroxide sulphate hydrate with a formula of $Zn_4SO_4 \cdot (OH)_6 \cdot xH_2O$ can form at the cathode-electrolyte interface, which increases the electrode resistance. The zinc hydroxide sulphate hydrate layer forms when proton intercalates into the $MnO2$ and releases extra $OH^-$ which then reacts with $ZnSO4$ and $Zn^{2+}$. Zinc hydroxide sulphate hydrate can block efficient transportation of the zinc (Zn) ion, the proton, and the electron, and cause an increase in the battery resistance. With an applied electrolyte circulation, the proton and the zinc (Zn) ions can more efficiently diffuse into the porous surface of the electrode. This enables higher battery kinetics and more efficient dissolution of zinc hydroxide sulphate hydrate, as compared to batteries with no electrolyte circulation. Moreover, the electrolyte circulation is capable of washing off inactive electrode materials particles or dendrites that can be transferred to a converter that converts the electrode particles into a desired ion solution for electrolyte usage. In addition, the flow promotes reversible dissolution and deposition of manganese oxides within the porous holes of the electrode.

The pump may be one or more of a rotary lobe pump, a progressive cavity pump, a rotary gear pump, a piston pump, a diaphragm pump, a screw pump, a gear pump, a hydraulic pump, a rotary vane pump, a peristaltic pump, a rope pump, a flexible impeller pump, a magnetic pump. One or more of the pump flow rate, pressure, and usage frequency may be controlled by the battery electrolyte controller to obtain a desired effect on the battery and to try and improve battery efficiency. The battery electrolyte controller can control pump on/off time, frequency, and/or flow rate, by recording and responding to battery conditions and information including voltage, current, time, capacity, power, etc. In some examples, the battery electrolyte controller receives (e.g., from a battery conditions analysis engine) the battery voltage (e.g., 1.3V, 1.4V, 1.5 V, 1.6V, 1.7 V, etc.) and the battery electrolyte controller can respond by switching on or off the circulation of the electrolyte. The battery conditions analysis engine can also be configured to measure the charging or discharging time and determine when the time reaches a predetermined charging or discharging time (e.g., 5 mins, 10 mins, 20 mins, 30 mins, 40 mins, 50 mins, 60 mins, 1 hour, 1.5 hours, 2 hours, 2.5 hours, 3 hours, 3.5 hours, 4 hours, 4.5 hours, 5 hours, 5.5 hours, 6 hours, 6.5 hours, 7 hours, 7.5 hours, 8 hours, 8.5 hours, 9 hours, 9.5 hours, 10 hours, etc.) the battery electrolyte controller can switch on or off the circulation of the electrolyte. The example flow rates from the circulation ranges from 1 mL/min/Ah to 10,000 mL/min/Ah with intervals of 1 mL/min/Ah. The example of the frequency of circulation can be during both charging and discharging steps, when the circulation is on during charging and off during discharging, or when the circulation is off during charging and on during discharging. Whether the circulation is on or off may depend on, for example, the voltage of battery. For example, the battery electrolyte controller may turn on circulation of the electrolyte when the charging voltage reaches 1.5V, 1.6V or 1.7V and the circulation may continue until charging finishes, and when discharging voltage reaches 1.4 V, 1.3V or 1.2V, the circulation turns on until discharging is finished. The circulation depends on the time of charging and discharging. For example, the circulation of the electrolyte can be on for 1 min to 1 hour with intervals of 1 min, then off for 1 min to 1 hour with intervals of 1 min, and the patten repeats until charging or discharging is finished. The battery electrolyte controller is able to control the charging and discharging voltage, current, and time. For example, the battery can be controlled to charge with a constant current until the voltage reaches 1.7 V, 1.71V, 1.72V, 1.73 V, 1.74 V, 1.75 V, 1.76 V, 1.77 V, 1.78 V, 1.79 V, 1.8V, 1.81V, 1.82V, 1.83 V, 1.84 V, 1.85 V, 1.86 V, 1.87 V, 1.88 V, 1.89 V, 1.9V, 1.91V, 1.92V, 1.93 V, 1.94 V, 1.95 V, 1.96 V, 1.97 V, 1.98 V, 1.99 V, or 2.0 V, then hold at a voltage for a constant voltage charging step until the target capacity is reached. For example, the battery can be controlled to discharge with a constant current until the voltage reaches 1.0 V, 1.01V, 1.02V, 1.03 V, 1.04 V, 1.05 V, 1.06 V, 1.07 V, 1.08 V, 1.09 V, 1.1V, 1.11V, 1.12V, 1.13 V, 1.14 V, 1.15 V, 1.16 V, 1.17 V, 1.18 V, 1.19 V, 1.2 V, 1.21V, 1.22V, 1.23 V, 1.24 V, 1.25 V, 1.26 V, 1.27 V, 1.28 V, 1.29 V, 1.3V, 1.31V, 1.32V, 1.33 V, 1.34 V, 1.35 V, 1.36 V, 1.37 V, 1.38 V, 1.39 V, 1.4V, 1.41V, 1.42V, 1.43 V, 1.44 V, 1.45 V, 1.46 V, 1.47 V, 1.48 V, 1.49 V, 1.5 V, 1.51V, 1.52V, 1.53 V, 1.54 V, 1.55 V, 1.56 V, 1.57 V, 1.58 V, 1.59 V, or 1.6 V, then hold at the voltage for a constant voltage discharging step until the voltage reaches a target capacity.

A liquid refill tank and control valve can be used to control one or more of the electrolyte level, volume, concentration, and composition. In some examples, the battery system may also be configured to add liquid from the liquid refill tank at predefined intervals, for example every 100 cycles, 200 cycles, 300 cycles, 400 cycles, 500 cycles, 600 cycles, 700 cycles, 800 cycles, 900 cycles, 1000 cycles, 1100 cycles, 1200 cycles, 1300 cycles, 1400 cycles, 1500 cycles, 1600 cycles, 1700 cycles, 1800 cycles, 1900 cycles, 2000 cycles, etc. The liquid in the tank is composed of one or more of water, MnSO4 solution, ZnSO4 solution, Aluminum sulfate solution, Nickle sulfate solution, Na2SO4 solution, H2SO4, NaOH, Zn acetate solution, Mn acetate solution, Na acetate solution, ZnCl2 solution, Zn nitrate solution, boric acid, and their combinations. The inlets and outlets can be one or many on each face of the battery case. One or more pumps can connect to the one or more of the inlets and outlets to help facilitate the flow of the electrolyte.

Discussion of Figures

Figure 2:
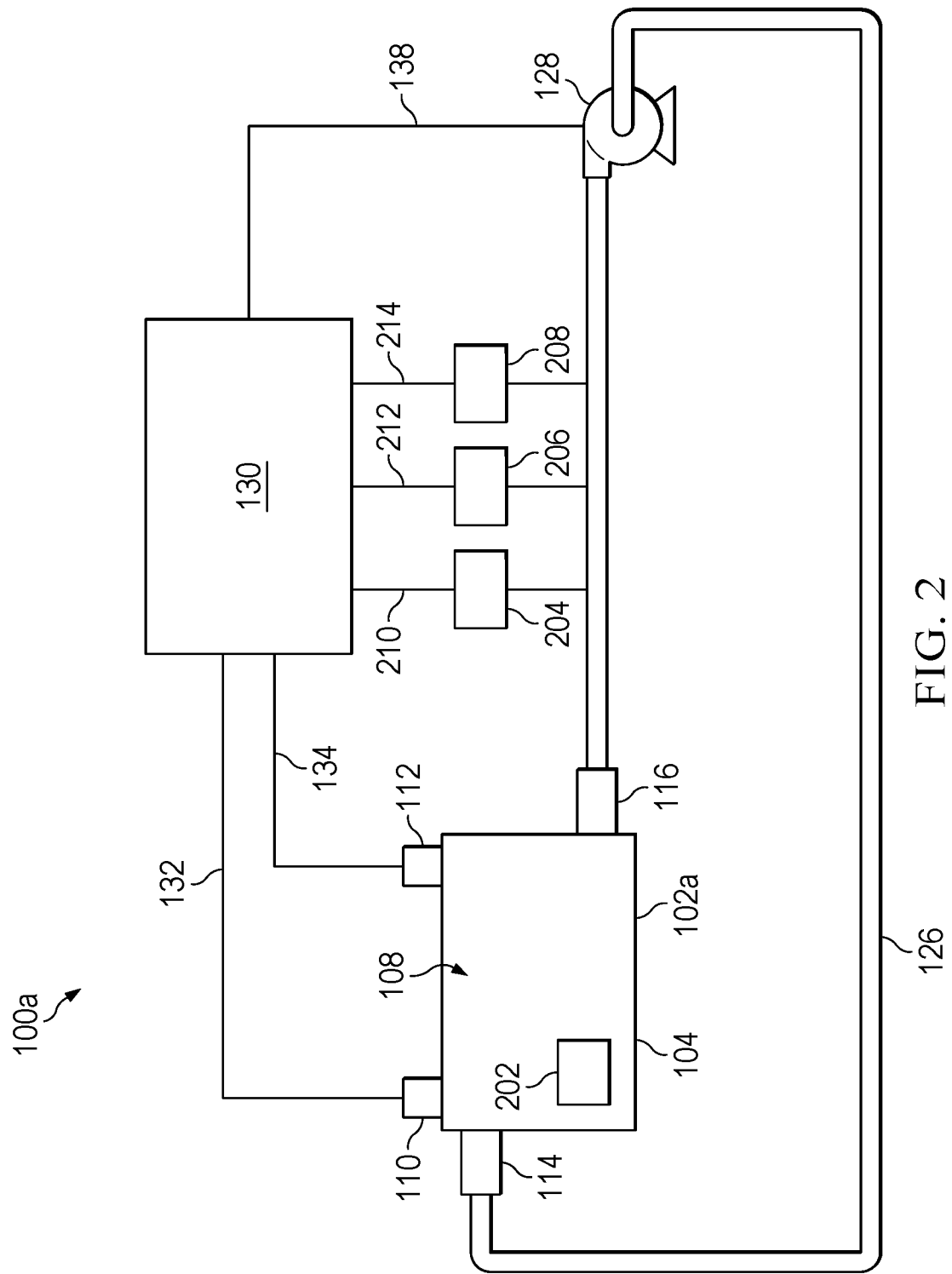
FIG. 2 is a simplified block diagram illustrating example details of a system to enable control of an electrolyte inside a battery, in accordance with an embodiment of the present disclosure.

Turning to FIG. 2, FIG. 2 illustrates example details of a battery system 100a, in accordance with an embodiment of the present disclosure. The battery system 100a can include a battery 102a, the electrolyte conduit 126, the pump 128, the battery electrolyte controller 130, a pH adjustment reservoir 204, a salt concentration reservoir 206, and an electrolyte reservoir 208. In an example, the battery 102a can include the outer casing 104, the plurality of electrodes 106 (shown in FIG. 1), the electrolyte 108, the positive terminal 110, the negative terminal 112, the inlet 114, the outlet 116, and an electrolyte level sensor 202. The electrolyte level sensor 202 can be in communication with the battery electrolyte controller 130 through a wireless connection or a wired connection. The plurality of electrodes 106 include at least one anode 118 (shown in FIG. 1) and at least one cathode 120 (shown in FIG. 1).

The outer casing 104 defines the interior space 122 inside the battery 102. The interior space 122 includes the plurality of electrodes 106 (the least one anode 118 and the at least one cathode 120) and the electrolyte 108 and helps keep the plurality of electrodes 106 and the electrolyte 108 from being exposed to the outside environment (e.g., the outside environment 124). The positive terminal 110 and the negative terminal 112 extend from the outer casing 104 into the outside environment. The inlet 114 and the outlet 116 also extend from the outer casing 104 into the outside environment. The electrolyte conduit 126 can extend from the outlet 116, to the pump 128, and to the inlet 114. The pump 128 can help circulate the electrolyte 108 through the electrolyte conduit 126.

The pH adjustment reservoir 204 can be coupled to the electrolyte conduit 126. The pH adjustment reservoir 204 can include one or more chemicals that can be used to adjust the pH of the electrolyte 108. For example, the pH adjustment reservoir 204 can include sulfuric acid, phosphoric acid, hydrochloric acid, nitric acid, carbon dioxide or some other chemical or material that can be added to the electrolyte 108 in the electrolyte conduit 126 and the pump 128 can be activated to circulate the electrolyte 108 with the added chemical or material to the battery 102a to decrease the pH of the electrolyte 108. In addition, the pH adjustment reservoir 204 can include zinc hydroxide, manganese hydroxide, sodium hydroxide, sodium carbonate, zinc carbonate, manganese carbonate, ammonium hydroxide, calcium hydroxide, magnesium hydroxide, or some other chemical or material that can be added to the electrolyte 108 in the electrolyte conduit 126 and the pump 128 can be activated to circulate the electrolyte 108 with the added chemical or material to the battery 102a to increase the pH of the electrolyte 108.

The salt concentration reservoir 206 can be coupled to the electrolyte conduit 126. The salt concentration reservoir 206 can include one or more chemicals that can be used to adjust the salt concentration of the electrolyte 108. For example, the salt concentration reservoir 206 can include aqueous or organic solution composed of cations such as $Zn^{2+}$, $Mn^{2+}$, proton, $Al^{3+}$, $Na^+$, $K^+$, $Mg^{2+}$, $Ni^{2+}$, $Cu^{2+}$, $Fe^{3+}$, $Co^{2+}$, $Ca^{2+}$, $NH^{4+}$, etc. and anions such as $PO_4^{3-}$, $SO_4^{2-}$, $CH_3COO-$, $Cl-$, $F-$, $Br-$, $NO_3-$, or some other chemical or material that can be added to the electrolyte 108 in the electrolyte conduit 126 and the pump 128 can be activated to circulate the electrolyte 108 with the added chemical or material to the battery 102a to increase the salt concentration of the electrolyte 108.

The electrolyte reservoir 208 can be coupled to the electrolyte conduit 126. The electrolyte reservoir 208 can include an extra amount of the electrolyte 108. When the electrolyte level sensor 202 detects that the level of the electrolyte 108 in the battery 102a is below a threshold level, all or a portion of the electrolyte 108 in the electrolyte reservoir 208 can be added to the electrolyte 108 in the electrolyte conduit 126 and the pump 128 can be activated to circulated the added electrolyte 108 to the battery 102a to raise the level of the electrolyte 108 above the threshold. In some examples, the threshold is at or slightly above a height of the active portion of the electrodes 106 (the portion of the electrode 106 that reacts with the electrolyte to produces electrons or accept electrons, depending if the electrode 106 is an anode or a cathode).

The battery electrolyte controller 130 can be connected to the positive terminal 110 using a positive terminal communication channel 132 and to the negative terminal 112 using a negative terminal communication channel 134. The battery electrolyte controller 130 can also be connected to the pump 128 using a pump communication channel 138, to the pH adjustment reservoir 204 using a pH control channel 210, to the salt concentration reservoir 206 using a salt concentration control channel 212, and to the electrolyte reservoir 208 using an electrolyte level control channel 214.

Figure 3:
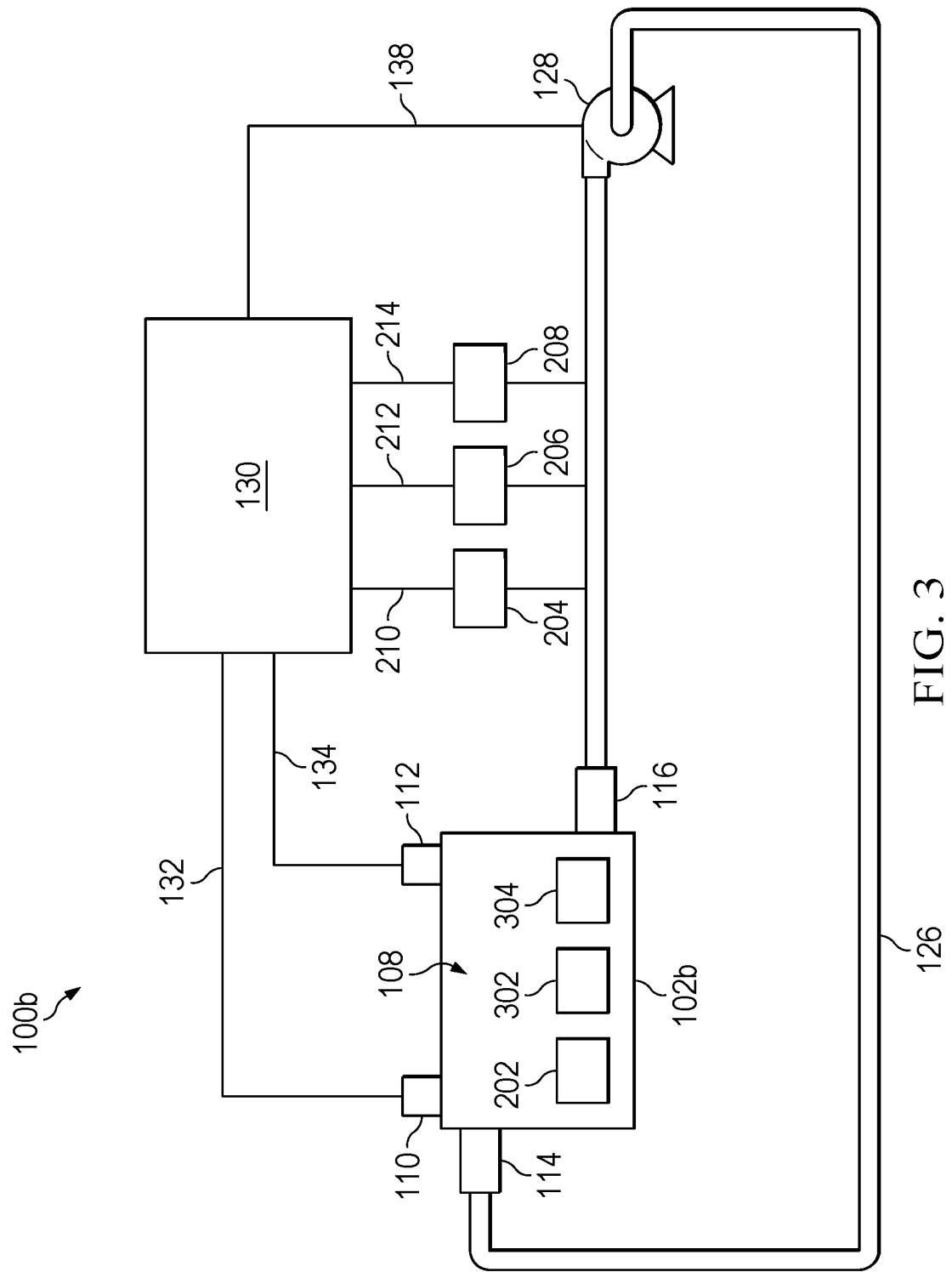
FIG. 3 is a simplified block diagram illustrating example details of a system to enable control of an electrolyte inside a battery, in accordance with an embodiment of the present disclosure.

Turning to FIG. 3, FIG. 3 illustrates example details of a battery system 100b, in accordance with an embodiment of the present disclosure. The battery system 100b can include a battery 102b, the electrolyte conduit 126, the pump 128, the battery electrolyte controller 130, the pH adjustment reservoir 204, the salt concentration reservoir 206, and the electrolyte reservoir 208. In an example, the battery 102b can include the outer casing 104, the plurality of electrodes 106 (shown in FIG. 1), the electrolyte 108, the positive terminal 110, the negative terminal 112, the inlet 114, the outlet 116, the electrolyte level sensor 202, a pH level sensor 302, and a salt concentration sensor 304. The pH level sensor 302 can be in communication with the battery electrolyte controller 130 through a wireless connection or a wired connection. The salt concentration sensor 304 can be in communication with the battery electrolyte controller 130 through a wireless connection or a wired connection. The plurality of electrodes 106 include at least one anode 118 (shown in FIG. 1) and at least one cathode 120 (shown in FIG. 1).

The outer casing 104 defines an interior space 122 inside the battery 102. The interior space 122 includes the plurality of electrodes 106 (the least one anode 118 and the at least one cathode 120) and the electrolyte 108 and helps keep the plurality of electrodes 106 and the electrolyte 108 from being exposed to the outside environment (e.g., the outside environment 124). The positive terminal 110 and the negative terminal 112 extend from the outer casing 104 into the outside environment. The inlet 114 and the outlet 116 also extend from the outer casing 104 into the outside environment. The electrolyte conduit 126 can extend from the outlet 116, to the pump 128, and to the inlet 114. The pump 128 can help circulate the electrolyte 108 through the electrolyte conduit 126.

The pH adjustment reservoir 204 can be coupled to the electrolyte conduit 126. When the pH level sensor 302 detects that the pH level of the electrolyte 108 in the battery 102b is above or below a threshold level, the pH adjustment reservoir 204 can be used to adjust the pH of the electrolyte 108. The threshold depends on the types of anodes and cathodes used in the battery 102b. The salt concentration reservoir 206 can be coupled to the electrolyte conduit 126. When the salt concentration sensor 304 detects that the salt concentration of the electrolyte 108 in the battery 102b is below a threshold level, the salt concentration reservoir 206 can be used to adjust the salt concentration of the electrolyte 108. The electrolyte reservoir 208 can be coupled to the electrolyte conduit 126. The electrolyte reservoir 208 can include stored electrolyte 108. When the electrolyte level sensor 202 detects that the level of the electrolyte 108 in the battery 102b is below a threshold level, all or a portion of the electrolyte 108 in the electrolyte reservoir 208 can be added to the electrolyte 108 in the electrolyte conduit 126 and the pump 128 can be activated to circulated the added electrolyte 108 to the battery 102b to raise the level of the electrolyte 108 above the threshold. The threshold depends on the types of anodes and cathodes used in the battery 102b.

The battery electrolyte controller 130 can be connected to the positive terminal 110 using a positive terminal communication channel 132 and to the negative terminal 112 using a negative terminal communication channel 134. The battery electrolyte controller 130 can also be connected to the pump 128 using the pump communication channel 138, to the pH adjustment reservoir 204 using the pH control channel 210, to the salt concentration reservoir 206 using the salt concentration control channel 212, and to the electrolyte reservoir 208 using an electrolyte level control channel 214.

Figure 4:
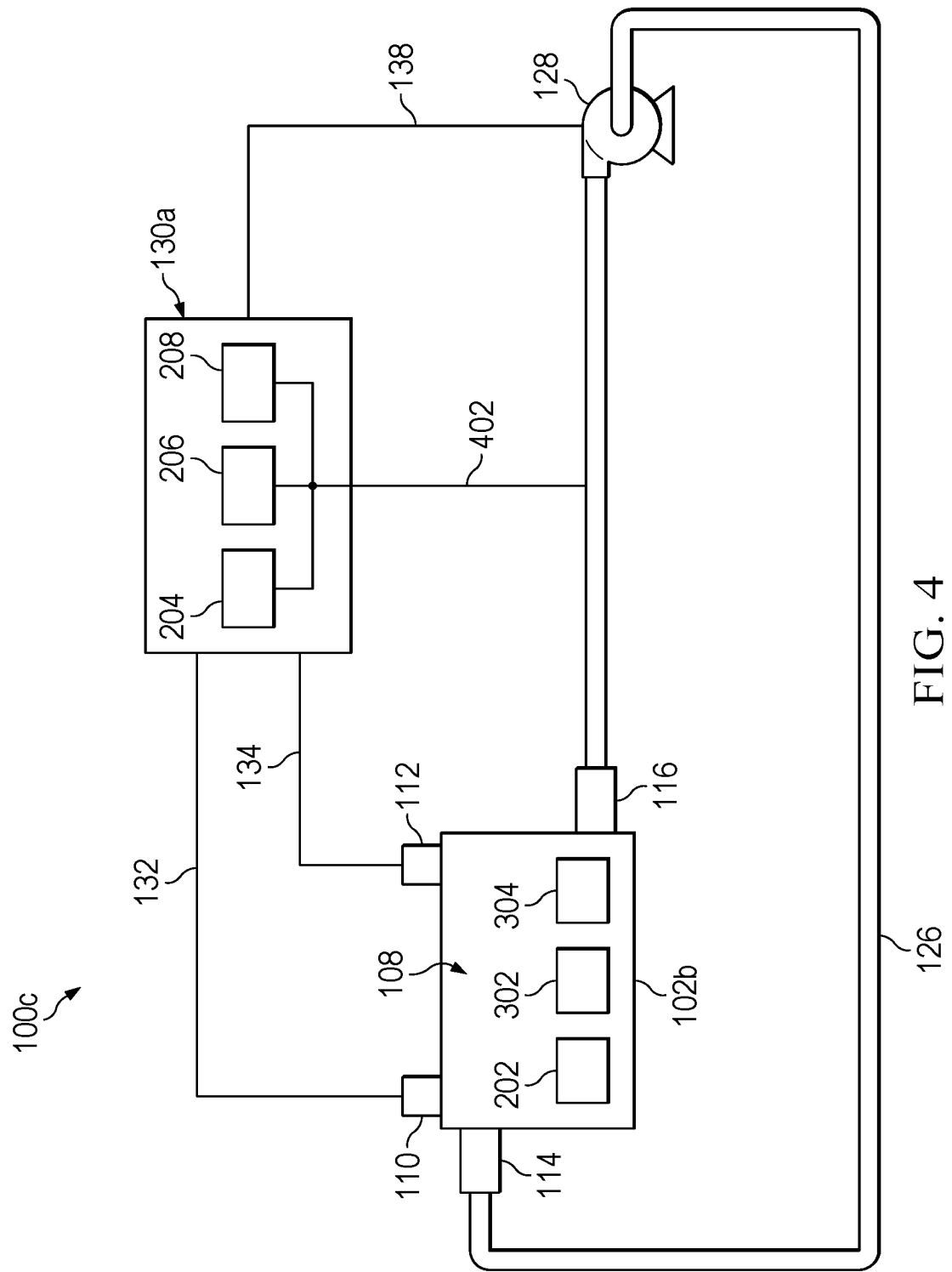
FIG. 4 is a simplified block diagram illustrating example details of a system to enable control of an electrolyte inside a battery, in accordance with an embodiment of the present disclosure.

Turning to FIG. 4, FIG. 4 illustrates example details of a battery system 100c, in accordance with an embodiment of the present disclosure. The battery system 100c can include the battery 102b, the electrolyte conduit 126, the pump 128, and a battery electrolyte battery electrolyte controller 130a. In an example, the battery 102b can include the outer casing 104, the plurality of electrodes 106 (shown in FIG. 1), the electrolyte 108, the positive terminal 110, the negative terminal 112, the inlet 114, the outlet 116, the electrolyte level sensor 202, the pH level sensor 302, and the salt concentration sensor 304. The plurality of electrodes 106 include at least one anode 118 (shown in FIG. 1) and at least one cathode 120 (shown in FIG. 1).

The outer casing 104 defines the interior space 122 inside the battery 102. The interior space 122 includes the plurality of electrodes 106 (the least one anode 118 and the at least one cathode 120) and the electrolyte 108 and helps keep the plurality of electrodes 106 and the electrolyte 108 from being exposed to the outside environment (e.g., the outside environment 124). The positive terminal 110 and the negative terminal 112 extend from the outer casing 104 into the outside environment. The inlet 114 and the outlet 116 also extend from the outer casing 104 into the outside environment. The electrolyte conduit 126 can extend from the outlet 116, to the pump 128, and to the inlet 114. The pump 128 can help circulate the electrolyte 108 through the electrolyte conduit 126.

The battery electrolyte battery electrolyte controller 130a can be connected to the positive terminal 110 using the positive terminal communication channel 132 and to the negative terminal 112 using the negative terminal communication channel 134. The battery electrolyte battery electrolyte controller 130a can also be connected to the pump 128 using the pump communication channel 138. The battery electrolyte battery electrolyte controller 130a can include the pH adjustment reservoir 204, the salt concentration reservoir 206, and the electrolyte reservoir 208. The battery electrolyte battery electrolyte controller 130a can activate the pH adjustment reservoir 204, the salt concentration reservoir 206, and/or the electrolyte reservoir 208 and inject or add the contents of the pH adjustment reservoir 204, the salt concentration reservoir 206, and/or the electrolyte reservoir 208 into the electrolyte 108 in the electrolyte conduit 126 using an electrolyte condition adjustment conduit 402.

When the pH level sensor 302 detects that the pH level of the electrolyte 108 in the battery 102b is above or below a threshold level, the pH adjustment reservoir 204 can be used to adjust the pH of the electrolyte 108. When the salt concentration sensor 304 detects that the salt concentration of the electrolyte 108 in the battery 102b is below a threshold level, the salt concentration reservoir 206 can be used to adjust the salt concentration of the electrolyte 108. When the electrolyte level sensor 202 detects that the level of the electrolyte 108 in the battery 102b is below a threshold level, all or a portion of the electrolyte 108 in the electrolyte reservoir 208 can be added to the electrolyte 108 in the electrolyte conduit 126 and the pump 128 can be activated to circulated the added electrolyte 108 to the battery 102b to raise the level of the electrolyte 108 above the threshold.

Figure 5:
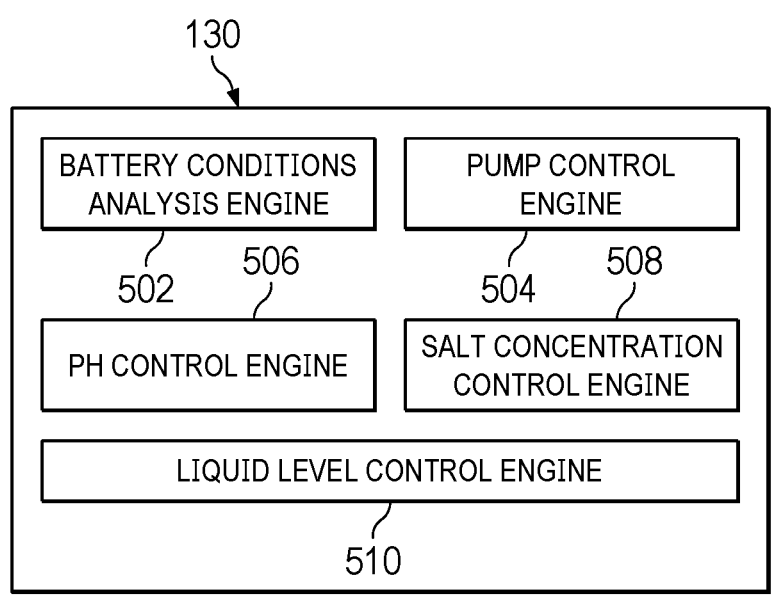
FIG. 5 is a simplified block diagram illustrating example details of a portion of a system to help enable control of an electrolyte inside a battery, in accordance with an embodiment of the present disclosure.

Turning to FIG. 5, FIG. 5 illustrates example details of the battery electrolyte controller 130. The battery electrolyte controller 130 can include a battery conditions analysis engine 502, a pump control engine 504, a pH control engine 506, a salt concentration control engine 508 and a liquid level control engine 510. The battery conditions analysis engine 502 can be configured to analyze the conditions of a battery (e.g., battery 102). In some examples, the battery electrolyte controller 130 is coupled to the positive terminal 110 and the negative terminal 112 and the battery conditions analysis engine 502 can be configured to read information from battery cells in the battery including voltage, current, capacity, etc. The battery conditions analysis engine 502 can use the voltage, current, capacity, etc. obtained from the battery cells and determine one or more conditions related to the battery.

In addition, the battery may include one or more of the electrolyte level sensor 202, the pH level sensor 302, and the salt concentration sensor 304 and battery conditions analysis engine 502 can use the information from one or more of the electrolyte level sensor 202, a pH level sensor 302, and a salt concentration sensor 304 determine one or more conditions related to the battery. The battery electrolyte controller 130 can use the determined one or more conditions related to the battery from the battery conditions analysis engine 502 to determine if conditions in the battery need to be adjusted. For example, the battery electrolyte controller 130 can use the determined one or more conditions related to the battery from the battery conditions analysis engine 502 to determine the energy and time to adjust the flow rate of the electrolyte, to adjust the electrolyte level in the battery, to adjust the pH level of the electrolyte in the battery, to adjust the salt concentrations of the electrolyte in the battery, or other conditions of the battery. More specifically, based on the determined one or more conditions related to the battery from the battery conditions analysis engine 502, the pump control engine 504 can be configured to activate and deactivate the pump and control the flow rate of the electrolyte.

Also, based on the determined one or more conditions related to the battery from the battery conditions analysis engine 502, the pH control engine 506 can be configured to determine if the pH of the electrolyte should be raised or lowered. If the pH control engine 506 determines that the pH should be raised or lowered, the pH control engine 506 can send a signal to the pH adjustment reservoir 204 to cause material to be added to the electrolyte to raise or lower the pH of the electrolyte. For example, the pH control engine 506 can send a signal to the pH adjustment reservoir 204 to cause material to be added to the electrolyte in the electrolyte conduit 126 to raise or lower the pH of the electrolyte and the pump control engine 504 can activate the pump to push the electrolyte with the material to raise or lower the pH into the battery.

In addition, based on the determined one or more conditions related to the battery from the battery conditions analysis engine 502, the salt concentration control engine 508 can be configured to determine if the salt concentration of the electrolyte should be raised or lowered. If the salt concentration control engine 508 determines that the salt concentration should be raised or lowered, the salt concentration control engine 508 can send a signal to the salt concentration reservoir 206 to cause material to be added to the electrolyte to raise or lower the salt concentration of the electrolyte. For example, the salt concentration control engine 508 can send a signal to the salt concentration reservoir 206 to cause material to be added to the electrolyte in the electrolyte conduit 126 to raise or lower the salt concentration of the electrolyte and the pump control engine 504 can activate the pump to push the electrolyte with the material to raise or lower the salt concentration into the battery.

Further, based on the determined one or more conditions related to the battery from the battery conditions analysis engine 502, the liquid level control engine 510 can be configured to determine if the level of the electrolyte in the battery should be raised or lowered. If the liquid level control engine 510 determines that the electrolyte level in the battery should be raised or lowered, the liquid level control engine 510 can send a signal to the electrolyte reservoir 208 to cause the electrolyte in the battery to be raised or lowered. For example, if the liquid level control engine 510 determines that the electrolyte level in the battery should be raised, the liquid level control engine 510 can send a signal to the electrolyte reservoir 208 to cause electrolyte to be added in the electrolyte conduit 126 to raise the level of the electrolyte in the battery and the pump control engine 504 can activate the pump to push the electrolyte into the battery. If the liquid level control engine 510 determines that the electrolyte level in the battery should be lowered, the pump control engine 504 can activate the pump to pull the electrolyte from the battery and into the electrolyte reservoir 208 to lower the level of the electrolyte in the battery.

Figure 6A:
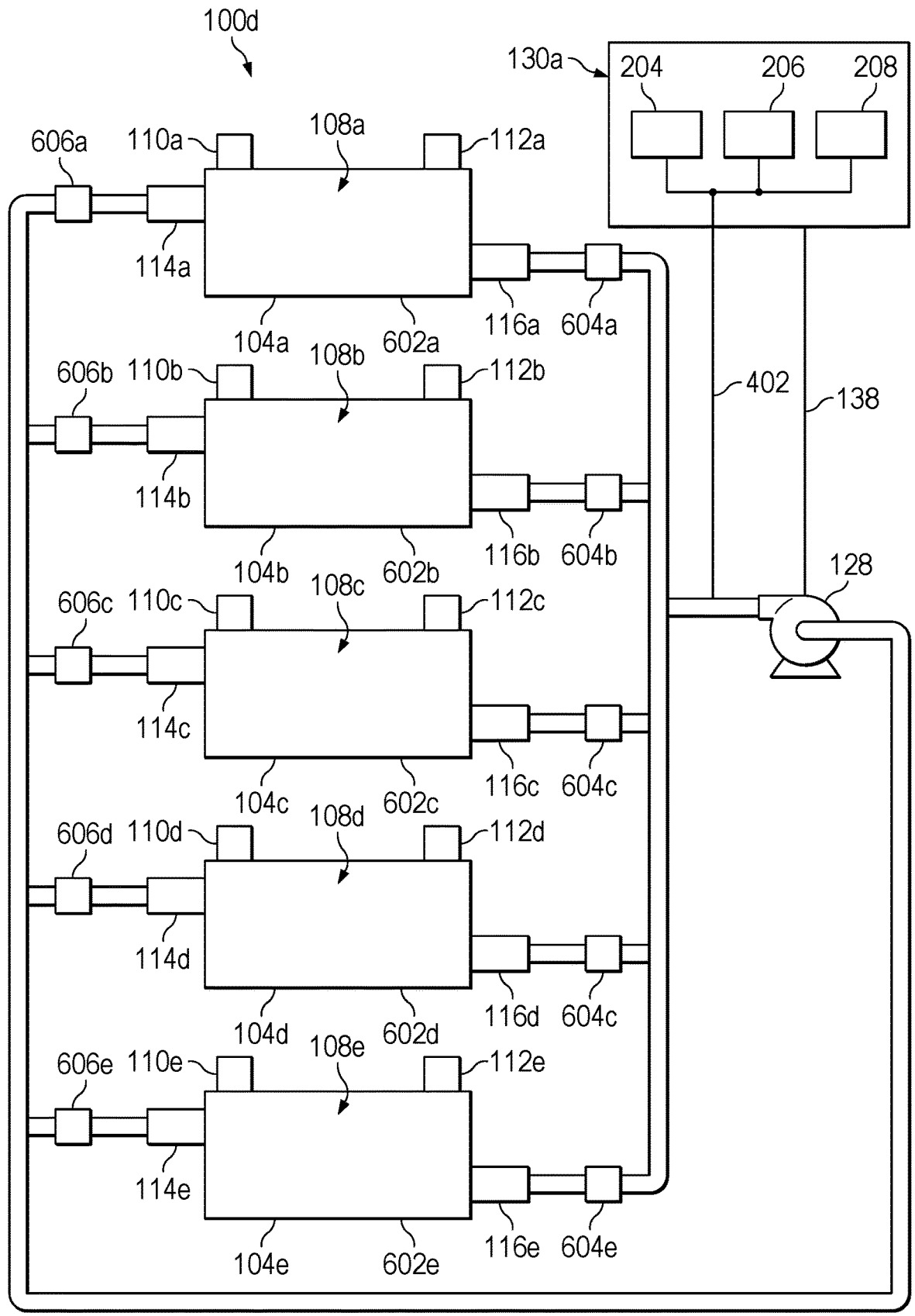
FIGS. 6A and 6B are a simplified block diagram illustrating example details of a system to enable control of an electrolyte inside a battery, in accordance with an embodiment of the present disclosure.
Figure 6B:
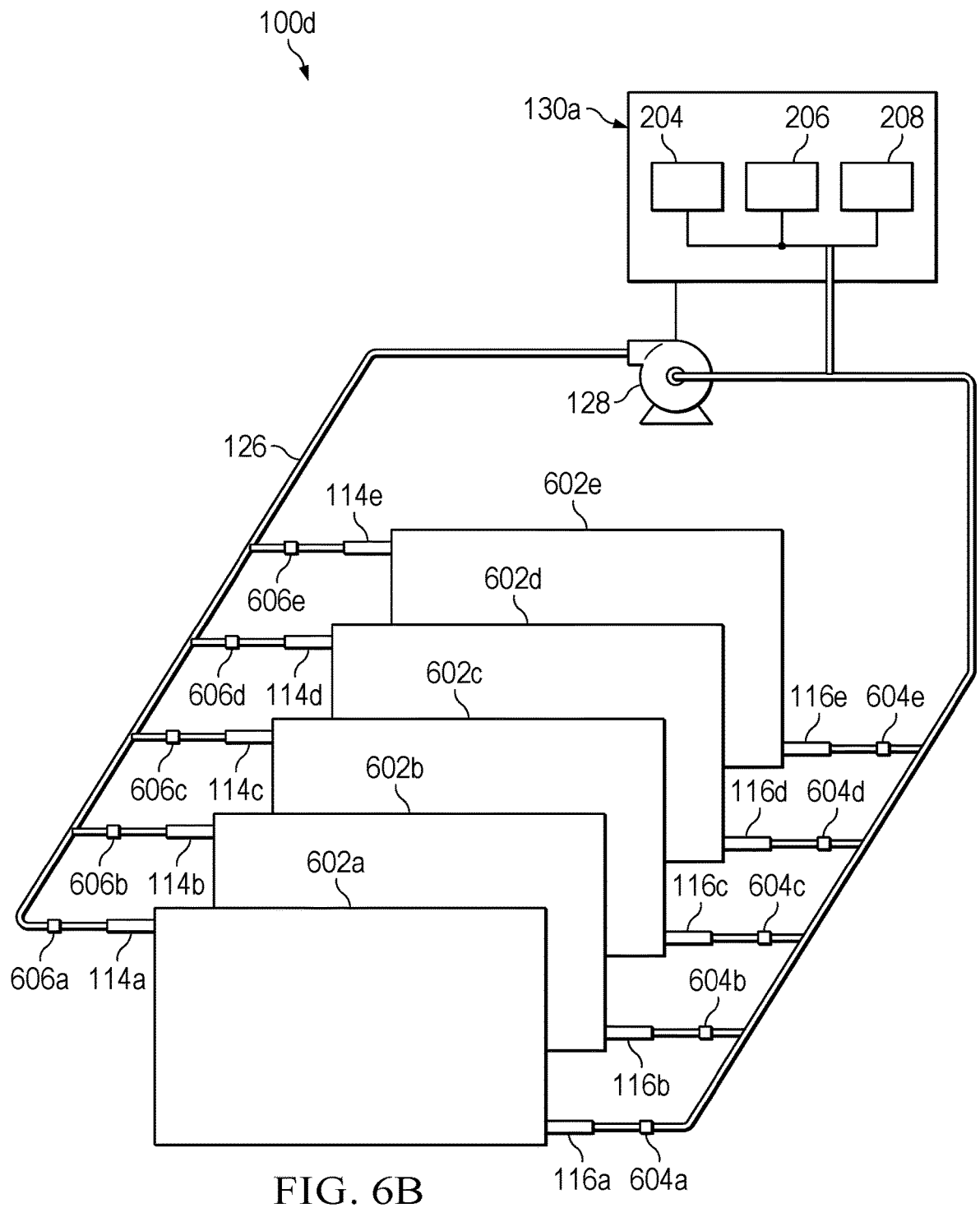

Turning to FIGS. 6A and 6B, FIGS. 6A and 6B illustrates example details of a battery system 100d. The battery system 100d can include the electrolyte conduit 126, the pump 128, a battery electrolyte battery electrolyte controller 130a, and a plurality of battery cells 602. The battery electrolyte battery electrolyte controller 130a can control each of the plurality of battery cells 602a-602e. In some examples, the plurality of battery cells 602a-602e are enclosed in a battery (e.g., battery 102) and each of the plurality of battery cells 602a-602e includes a plurality of electrodes (e.g., the plurality of electrodes 106).

Battery cell 602a can include an electrolyte 108a, a positive terminal 110a, a negative terminal 112a, an inlet 114a, and an outlet 116a. An inlet valve 604a can couple the electrolyte conduit 126 to the outlet 116a of the battery cell 602a. An outlet valve 606a can couple the electrolyte conduit 126 to the outlet 116a of the battery cell 602a. The battery electrolyte battery electrolyte controller 130a can control the pump 128 and the inlet valve 604a and the outlet valve 606a to control the flow of the electrolyte 108 to and from the battery cell 602a.

Battery cell 602b can include an electrolyte 108b, a positive terminal 110b, a negative terminal 112b, an inlet 114b, and an outlet 116b. An inlet valve 604b can couple the electrolyte conduit 126 to the inlet 114b of the battery cell 602b. An outlet valve 606b can couple the electrolyte conduit 126 to the outlet 116b of the battery cell 602b. The battery electrolyte battery electrolyte controller 130a can control the pump 128 and the inlet valve 604b and the outlet valve 606b to control the flow of the electrolyte 108 to and from the battery cell 602b.

Battery cell 602c can include an electrolyte 108c, a positive terminal 110c, a negative terminal 112c, an inlet 114c, and an outlet 116c. An inlet valve 604c can couple the electrolyte conduit 126 to the inlet 114c of the battery cell 602c. An outlet valve 606c can couple the electrolyte conduit 126 to the outlet 116c of the battery cell 602c. The battery electrolyte battery electrolyte controller 130a can control the pump 128 and the inlet valve 604c and the outlet valve 606c to control the flow of the electrolyte 108 to and from the battery cell 602c.

Battery cell 602d can include an electrolyte 108d, a positive terminal 110d, a negative terminal 112d, an inlet 114d, and an outlet 116d. An inlet valve 604d can couple the electrolyte conduit 126 to the inlet 114d of the battery cell 602d. An outlet valve 606d can couple the electrolyte conduit 126 to the outlet 116d of the battery cell 602d. The battery electrolyte battery electrolyte controller 130a can control the pump 128 and the inlet valve 604d and the outlet valve 606d to control the flow of the electrolyte 108 to and from the battery cell 602d.

Battery cell 602e can include an electrolyte 108e, a positive terminal 110e, a negative terminal 112e, an inlet 114e, and an outlet 116e. An inlet valve 604e can couple the electrolyte conduit 126 to the inlet 114e of the battery cell 602e. An outlet valve 606e can couple the electrolyte conduit 126 to the outlet 116e of the battery cell 602e. The battery electrolyte battery electrolyte controller 130a can control the pump 128 and the inlet valve 604e and the outlet valve 606e to control the flow of the electrolyte 108 to and from the battery cell 602e.

The battery electrolyte battery electrolyte controller 130a can include the pH adjustment reservoir 204, the salt concentration reservoir 206, and the electrolyte reservoir 208. The battery electrolyte battery electrolyte controller 130a can be connected to the pump 128 using the pump communication channel 138 and the battery electrolyte battery electrolyte controller 130a can be coupled to the electrolyte conduit 126 using the battery control electrolyte conduit 136. The battery electrolyte battery electrolyte controller 130a can monitor the conditions of each of the battery cells 602a-602e and using the inlet valve 604 and the outlet valve 606 associated with each of the battery cells 602a-602e, the battery electrolyte battery electrolyte controller 130a can independently adjust the conditions of the electrolyte 108 in each of the battery cells 602a-602e. For example, the battery electrolyte controller 130 can be connected to the positive terminal 110 and to the negative terminal 112 of each of the battery cells 602a-602e to monitor the condition of each of the battery cells 602a-602e (e.g., as illustrated in FIG. 1). In some examples, each of the battery cells 108a-108e can include the electrolyte level sensor 202, a pH level sensor 302, and a salt concentration sensor 304 and the battery electrolyte battery electrolyte controller 130a to monitor the condition of each of the battery cells 602a-602e using the electrolyte level sensor 202, the pH level sensor 302, and the salt concentration sensor 304 in each of the battery cells 108a-108e.

Figure 7A:
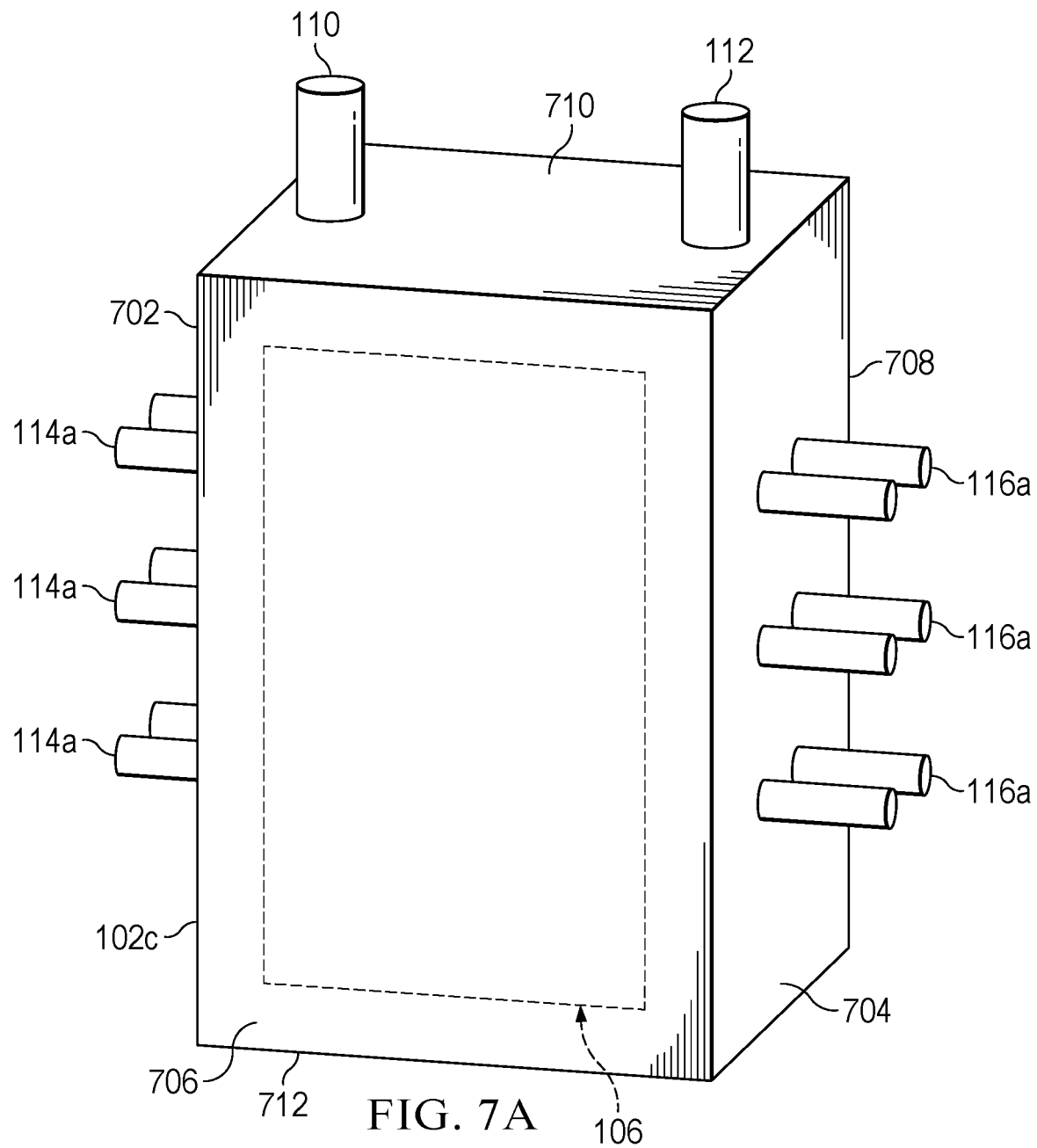
FIGS. 7A and 7B are simplified block diagrams illustrating example details of a portion of a system to help enable control of an electrolyte inside a battery, in accordance with an embodiment of the present disclosure.
Figure 7B:
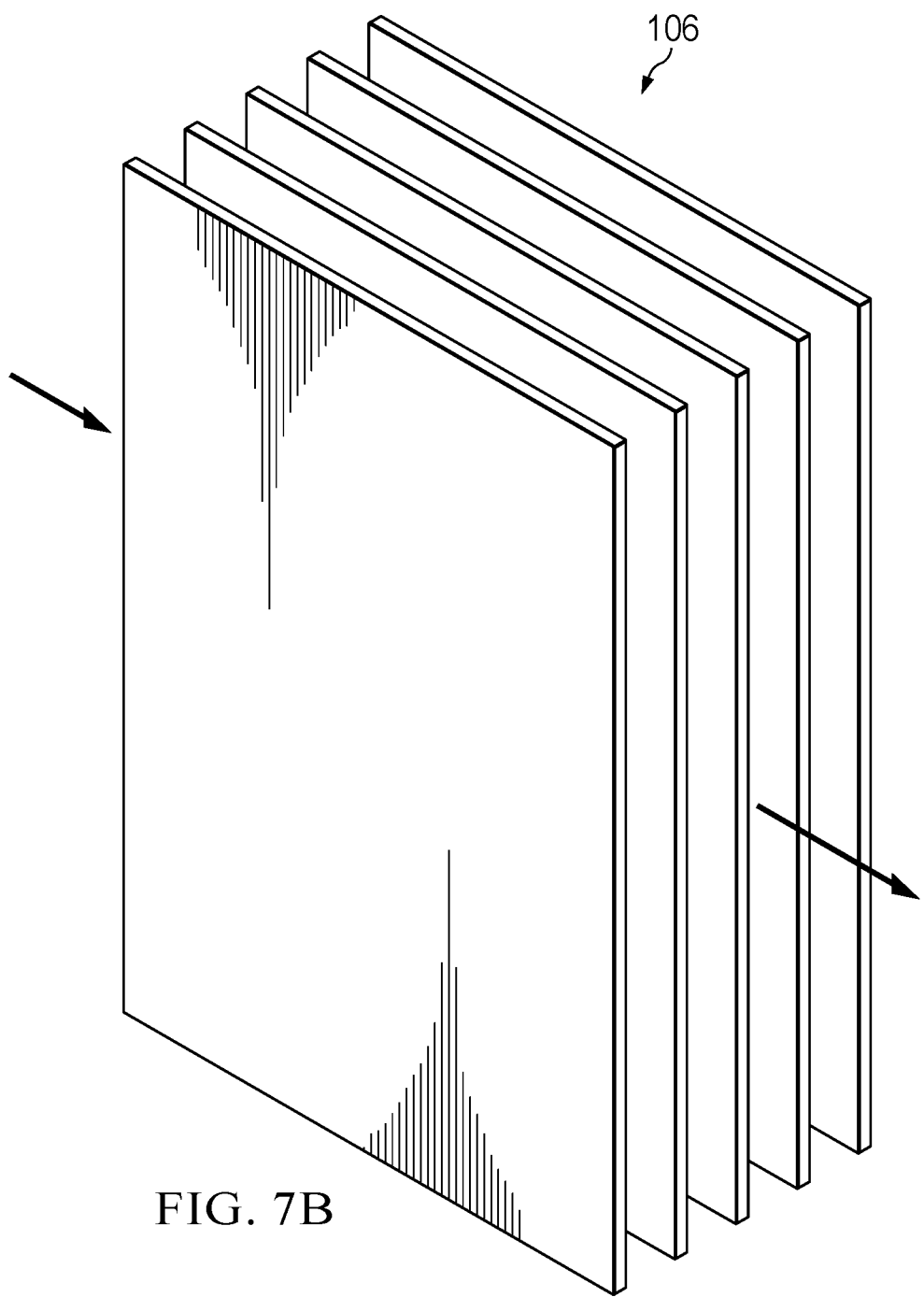

Turning to FIGS. 7A and 7B, FIGS. 7A and 7B are simple block diagrams illustrating example details of a battery 102c, in accordance with an embodiment of the present disclosure. As illustrated in FIG. 7A, the battery 102c can include the positive terminal 110, the negative terminal 112, a plurality of inlets 114a and a plurality of outlets 116a. The battery can also include a first side 702, a second side 704, a third side 706, a fourth side 708, a fifth side 710, and a sixth side 712. The first side 702 and the second side 704 are opposite sides. The third side 706 and the fourth side 708 are opposite sides and perpendicular to the first side 702 and the second side 704. The fifth side 710 and the sixth side 712 are opposite sides. The fifth side 710 can be on the top of the battery 102c and the sixth side 712 can be on the bottom of the battery 102c. In an example, the term "top" means the side with the positive terminal 110 and the negative terminal 112 (battery terminal installation) and the term "bottom" is the side opposite to the top.

The plurality of inlets 114a can be located on a first side 702 of the battery 102c and the plurality of outlets 116a can be located on an opposite second side 704 of the battery 102c. The plurality of inlets 114a and the plurality of outlets 116a can be positioned such that the flow of the electrolyte (not referenced) is between and through each of the plurality of electrodes 106 in the battery 102c. More specifically, as illustrated in FIG. 7B, the flow can be parallel-in and parallel-out from battery cell sides, relative to the electrodes 106. The number of the inlets 114a and the outlets 116a depends on the battery cell size and capacity.

Figure 8B:
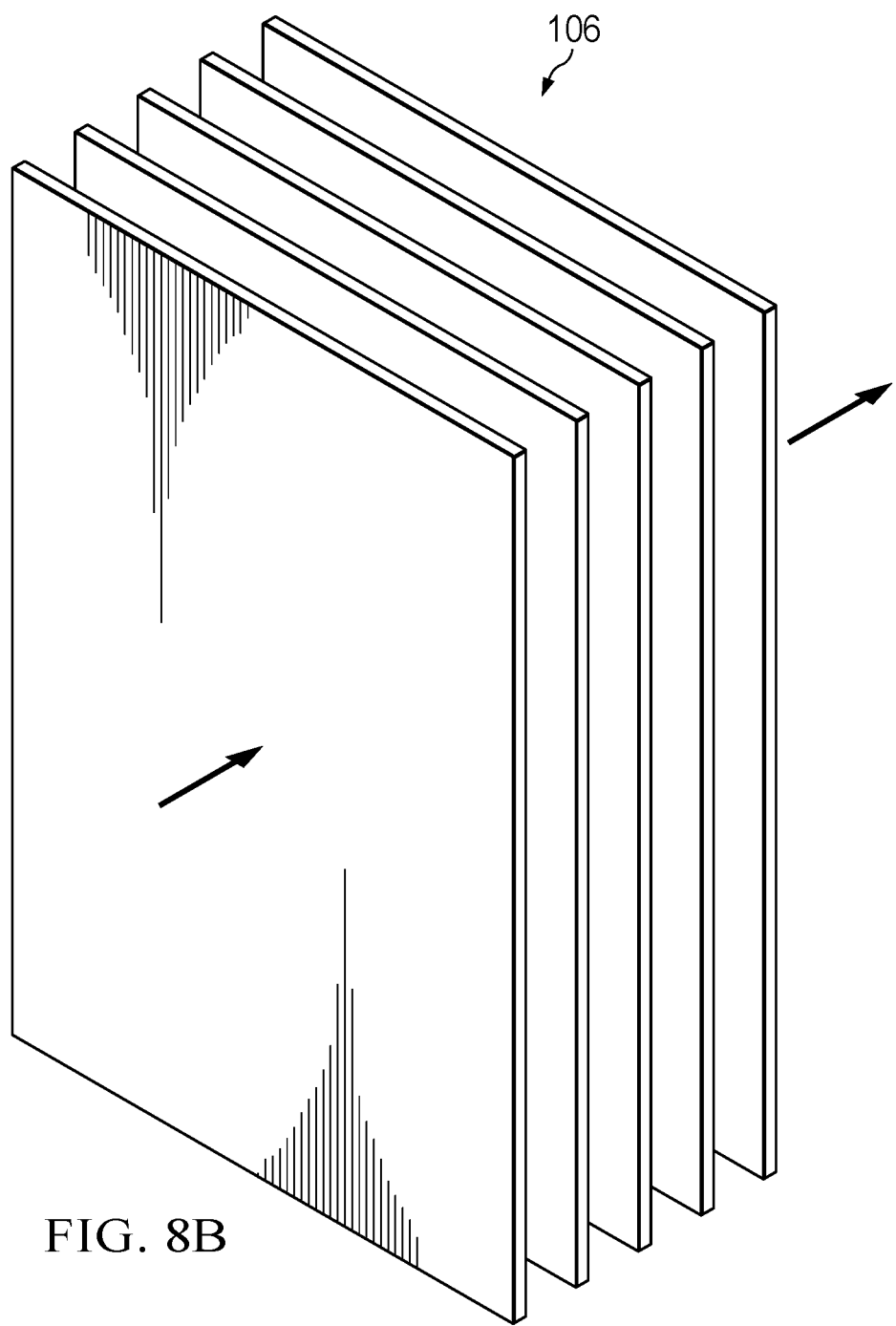

Turning to FIGS. 8A and 8B, FIGS. 8A and 8B are simple block diagrams illustrating example details of a battery 102d, in accordance with an embodiment of the present disclosure. As illustrated in FIG. 8A, the battery 102d can include the positive terminal 110, the negative terminal 112, a plurality of inlets 114b and a plurality of outlets 116b. The battery can include the first side 702, the second side 704, the third side 706, the fourth side 708, the fifth side 710, and the sixth side 712. The plurality of inlets 114b can be located on the third side 706 of the battery 102d and the plurality of outlets 116b can be located on the opposite fourth side 708 of the battery 102d. The plurality of inlets 114b and the plurality of outlets 116b can be positioned such that the flow of the electrolyte (not referenced) is through each of the plurality of electrodes 106 in the battery 102d. More specifically, as illustrated in FIG. 8B, the flow direction can also be perpendicular-in and perpendicular-out from cell sides, relative to the electrodes 106. The number of the inlets 114b and the outlets 116b depends on the battery cell size and capacity.

Figure 9A:
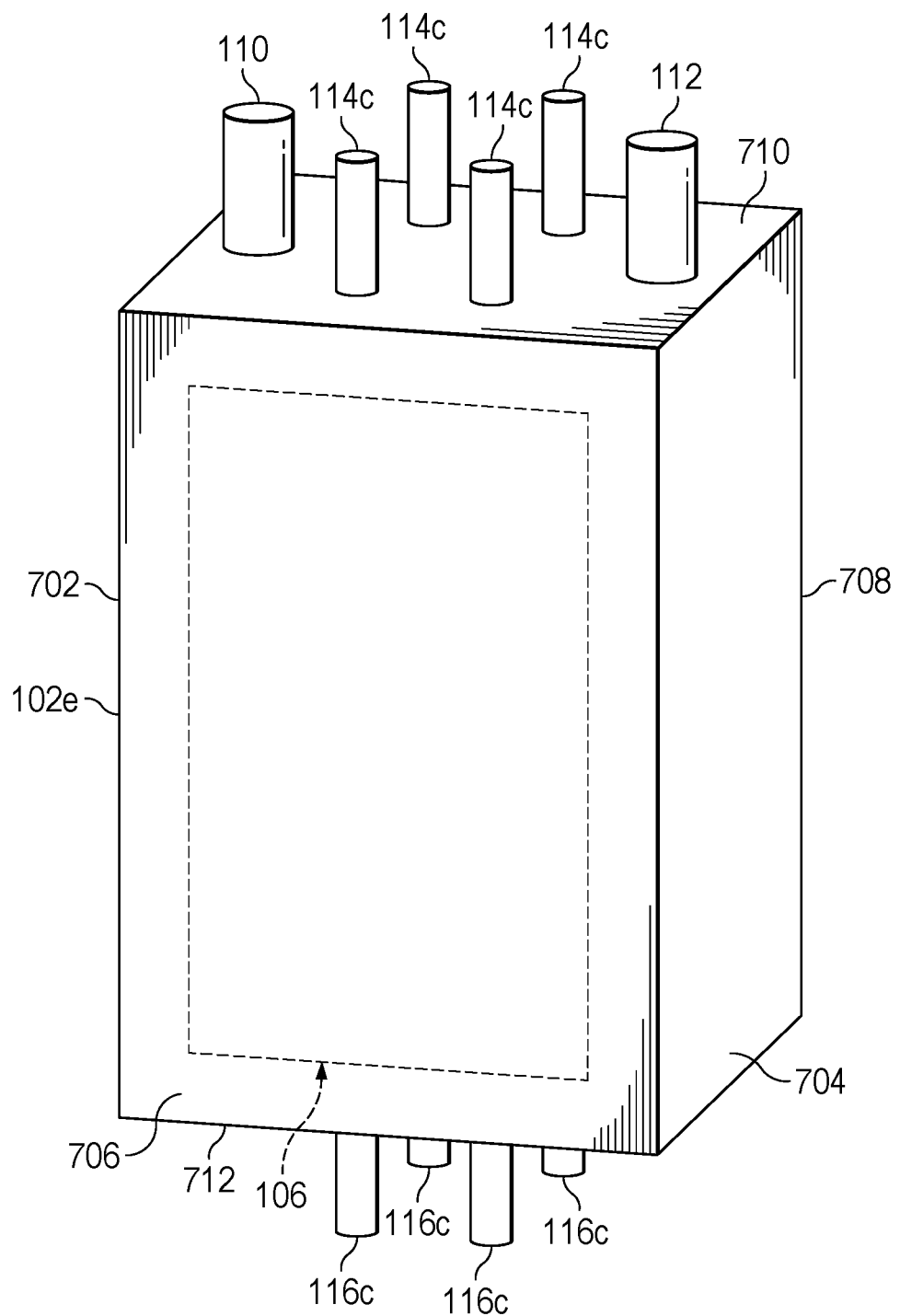
FIGS. 9A and 9B are simplified block diagrams illustrating example details of a portion of a system to help enable control of an electrolyte inside a battery, in accordance with an embodiment of the present disclosure.
Figure 9B:
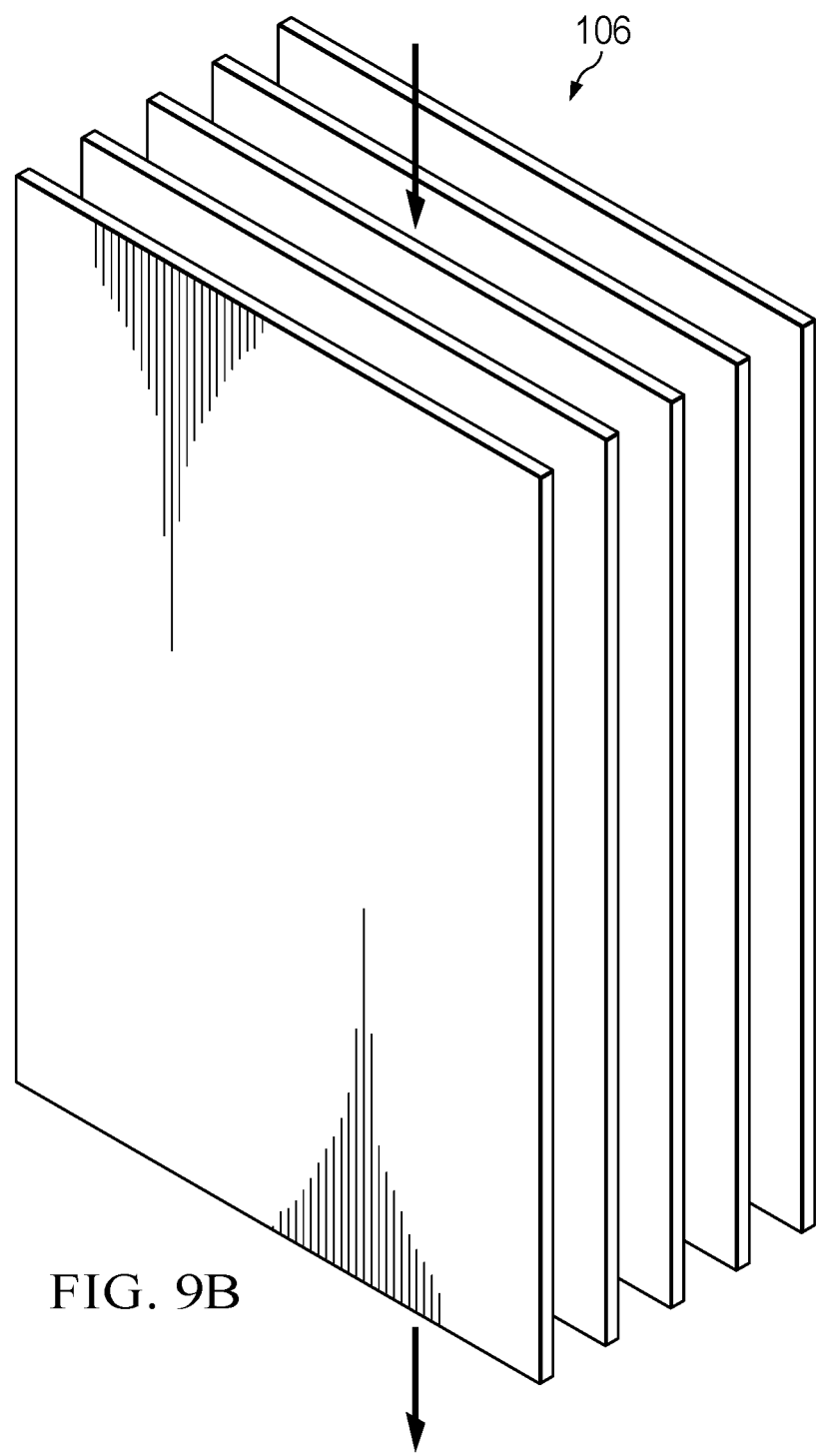

Turning to FIGS. 9A and 9B, FIGS. 9A and 9B are simple block diagrams illustrating example details of a battery 102e, in accordance with an embodiment of the present disclosure. As illustrated in FIG. 9A, the battery 102e can include the positive terminal 110, the negative terminal 112, a plurality of inlets 114c and a plurality of outlets 116c. The battery can include the first side 702, the second side 704, the third side 706, the fourth side 708, the fifth side 710, and the sixth side 712. The plurality of inlets 114c can be located on the fifth side 710 of the battery 102e and the plurality of outlets 116c can be located on the opposite sixth side 712 of the battery 102e. The plurality of inlets 114c and the plurality of outlets 116c can be positioned such that the flow of the electrolyte (not referenced) is between and through each of the plurality of electrodes 106 in the battery 102e. More specifically, as illustrated in FIG. 9B, the flow direction can be parallel-in and parallel-out from top and bottom of the battery 102e, relative to the electrodes 106.

Figure 10A:
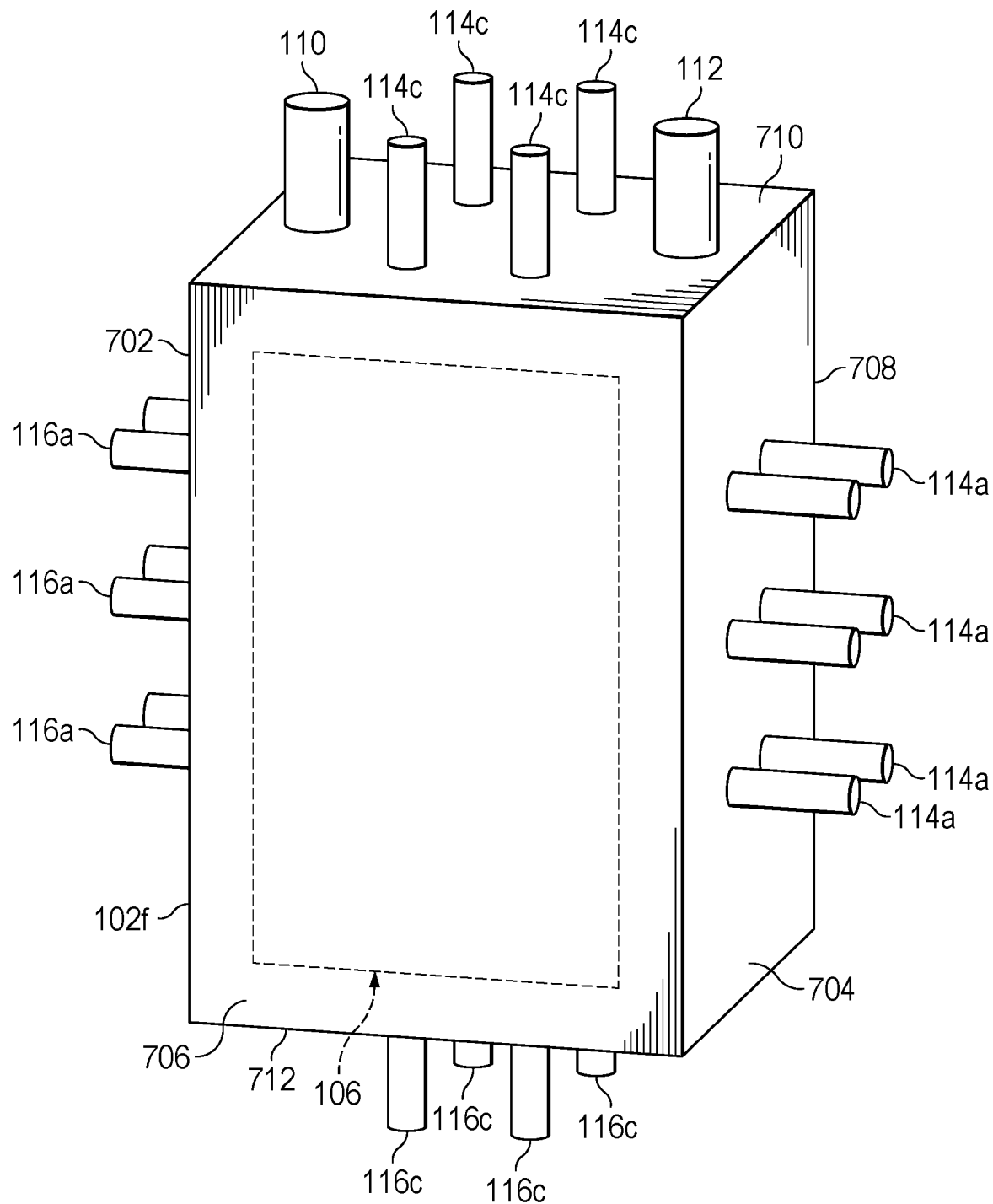
FIGS. 10A and 10B are simplified block diagrams illustrating example details of a portion of a system to help enable control of an electrolyte inside a battery, in accordance with an embodiment of the present disclosure.
Figure 10B:
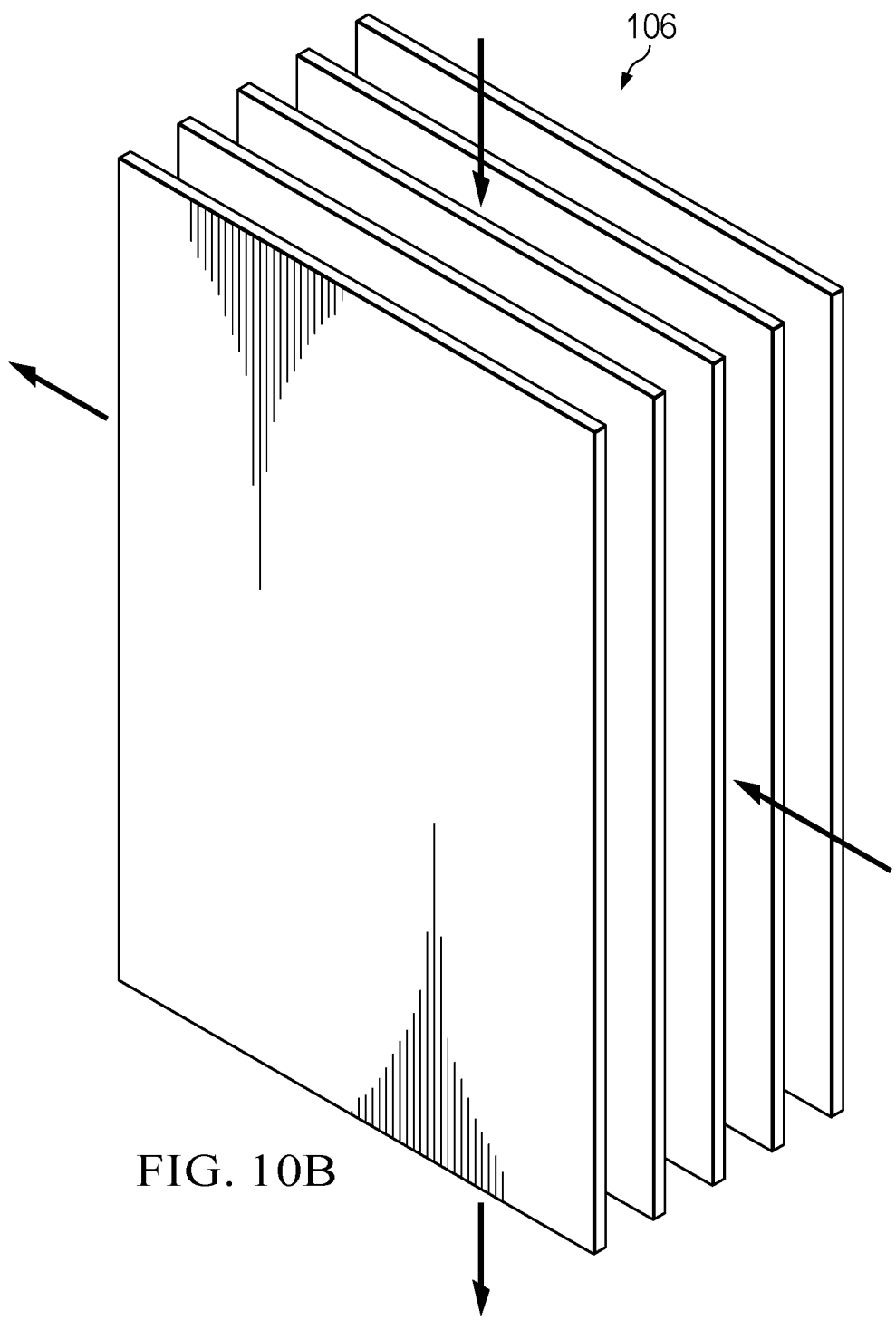

Turning to FIGS. 10A and 10B, FIGS. 10A and 10B are simple block diagrams illustrating example details of a battery 102f, in accordance with an embodiment of the present disclosure. As illustrated in FIG. 10A, the battery 102c can include the positive terminal 110, the negative terminal 112, a plurality of inlets 114a and 114c, and a plurality of outlets 116a and 116c. The battery can include the first side 702, the second side 704, the third side 706, the fourth side 708, the fifth side 710, and the sixth side 712. The plurality of inlets 114a can be located on the second side 704 of the battery 102f and the plurality of outlets 116a can be located on the opposite first side 702 of the battery 102f. The plurality of inlets 114c can be located on the fifth side 710 of the battery 102f and the plurality of outlets 116c can be located on the opposite sixth side 712 of the battery 102f. The plurality of inlets 114a and 114c and the plurality of outlets 116a and 116c can be positioned such that the flow of the electrolyte (not referenced) is between and through each of the plurality of electrodes 106 in the battery 102f. More specifically, as illustrated in FIG. 9B, the flow direction can be parallel-in and parallel-out from the sides of the battery 102f and parallel-in and parallel-out from the top and the bottom of the battery, relative to the electrodes 106. The number of the inlets 114a and 114c and the outlets 116a and 116c depends on the battery cell size and capacity.

Figure 11A:
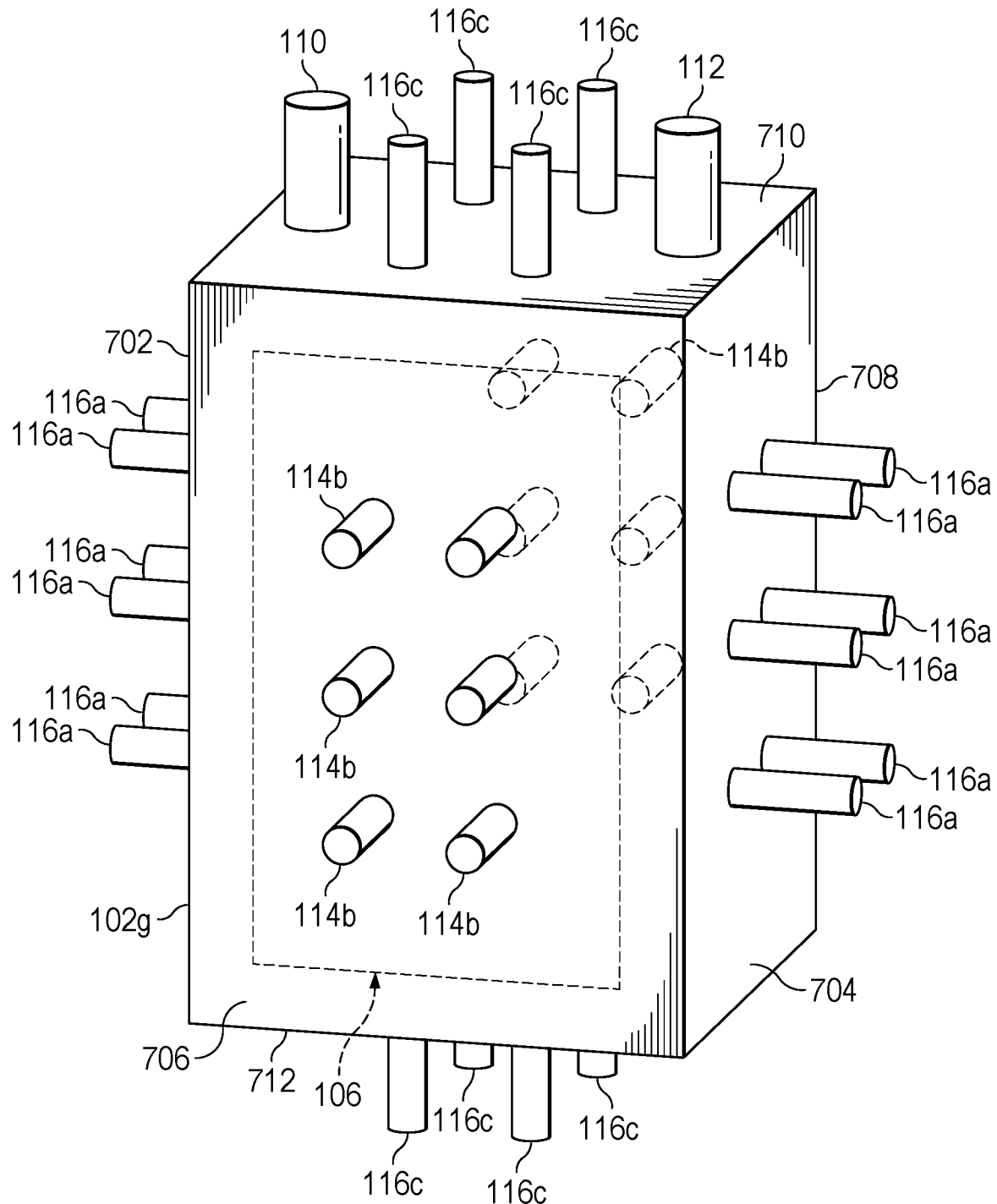
FIGS. 11A and 11B are simplified block diagrams illustrating example details of a portion of a system to help enable control of an electrolyte inside a battery, in accordance with an embodiment of the present disclosure.
Figure 11B:
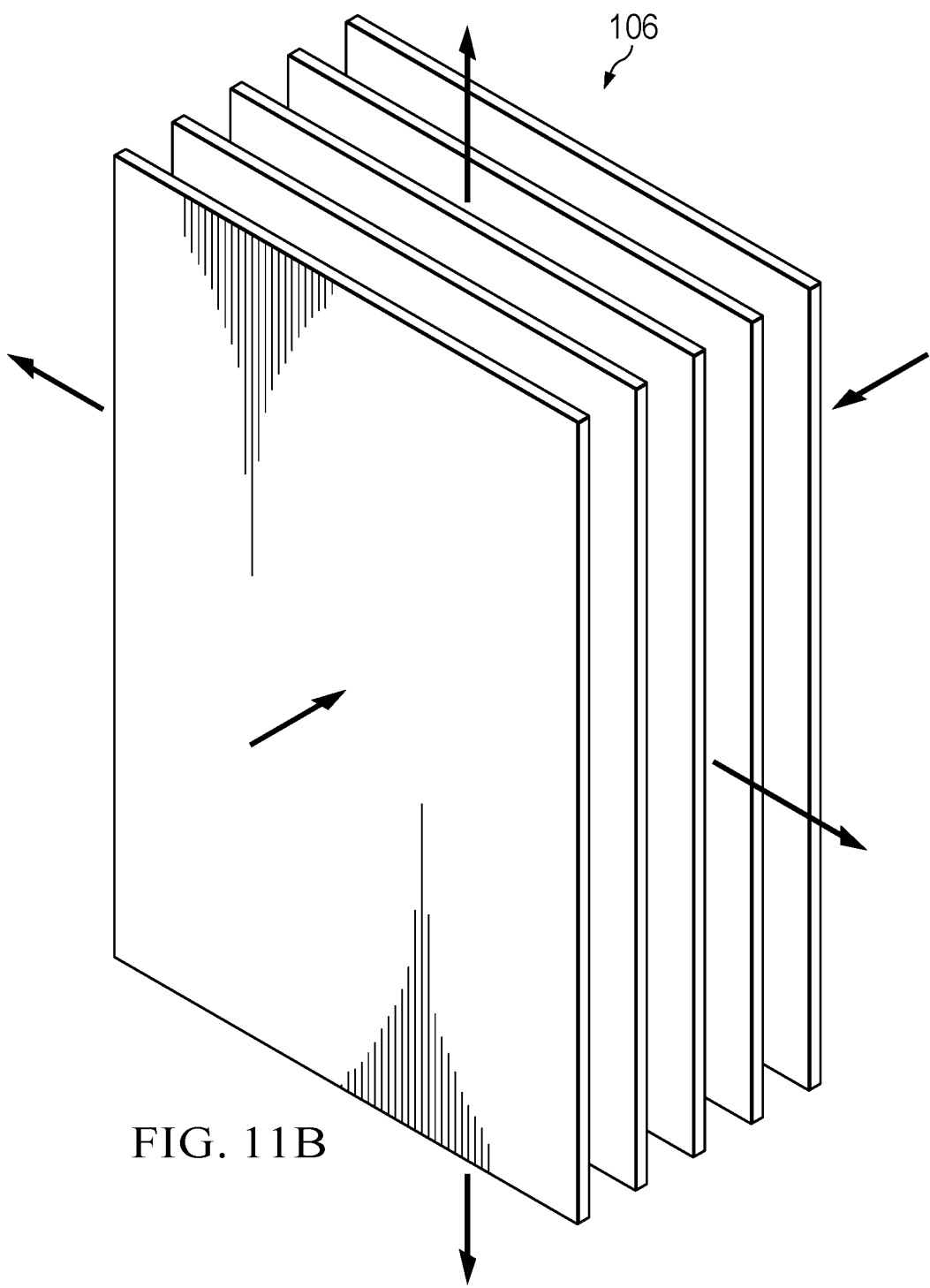

Turning to FIGS. 11A and 11B, FIGS. 11A and 11B are simple block diagrams illustrating example details of a battery 102g, in accordance with an embodiment of the present disclosure. As illustrated in FIG. 11A, the battery 102g can include the positive terminal 110, the negative terminal 112, a plurality of inlets 114b and a plurality of outlets 116a and 116c. The battery can include the first side 702, the second side 704, the third side 706, the fourth side 708, the fifth side 710, and the sixth side 712. The plurality of inlets 114a can be located on the third side 706 and the fourth side 708 of the battery 102g, the plurality of outlets 116a can be located on the first side 702 and the second side 704, and the plurality of outlets 116c can be located on the fifth side 710, and the sixth side 712 of the of the battery 102g. The plurality of inlets 114b and the plurality of outlets 116a and 116c can be positioned such that the flow of the electrolyte (not referenced) is between and through each of the plurality of electrodes 106 in the battery 102g. More specifically, as illustrated in FIG. 11B, the flow direction can be perpendicular-in and parallel-out from the sides of the battery 102g, relative to the electrodes 106. The number of the inlets 114b and the outlets 116a and 116c depends on the battery cell size and capacity.

Figure 12A:
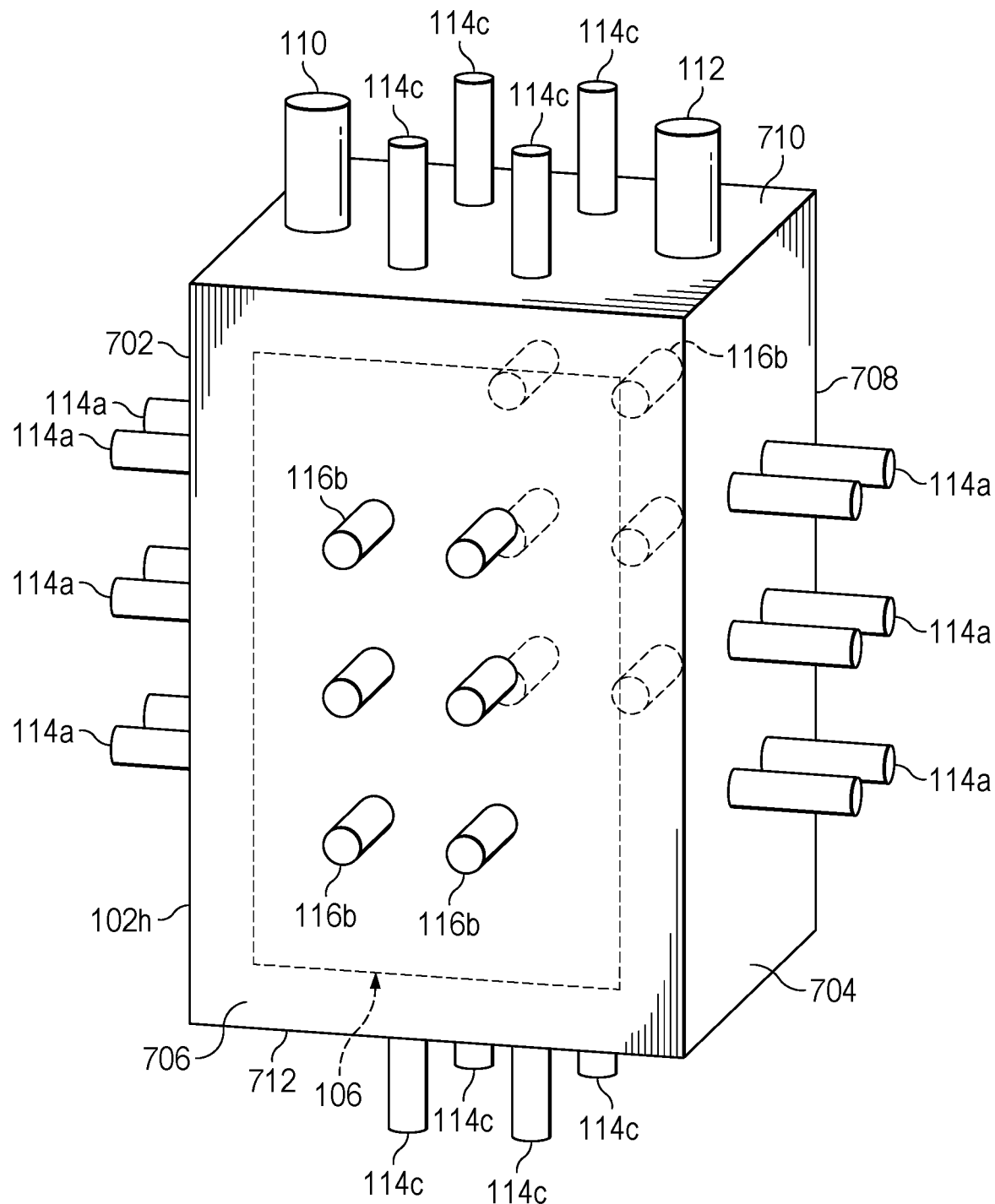
FIGS. 12A and 12B are simplified block diagrams illustrating example details of a portion of a system to help enable control of an electrolyte inside a battery, in accordance with an embodiment of the present disclosure.
Figure 12B:
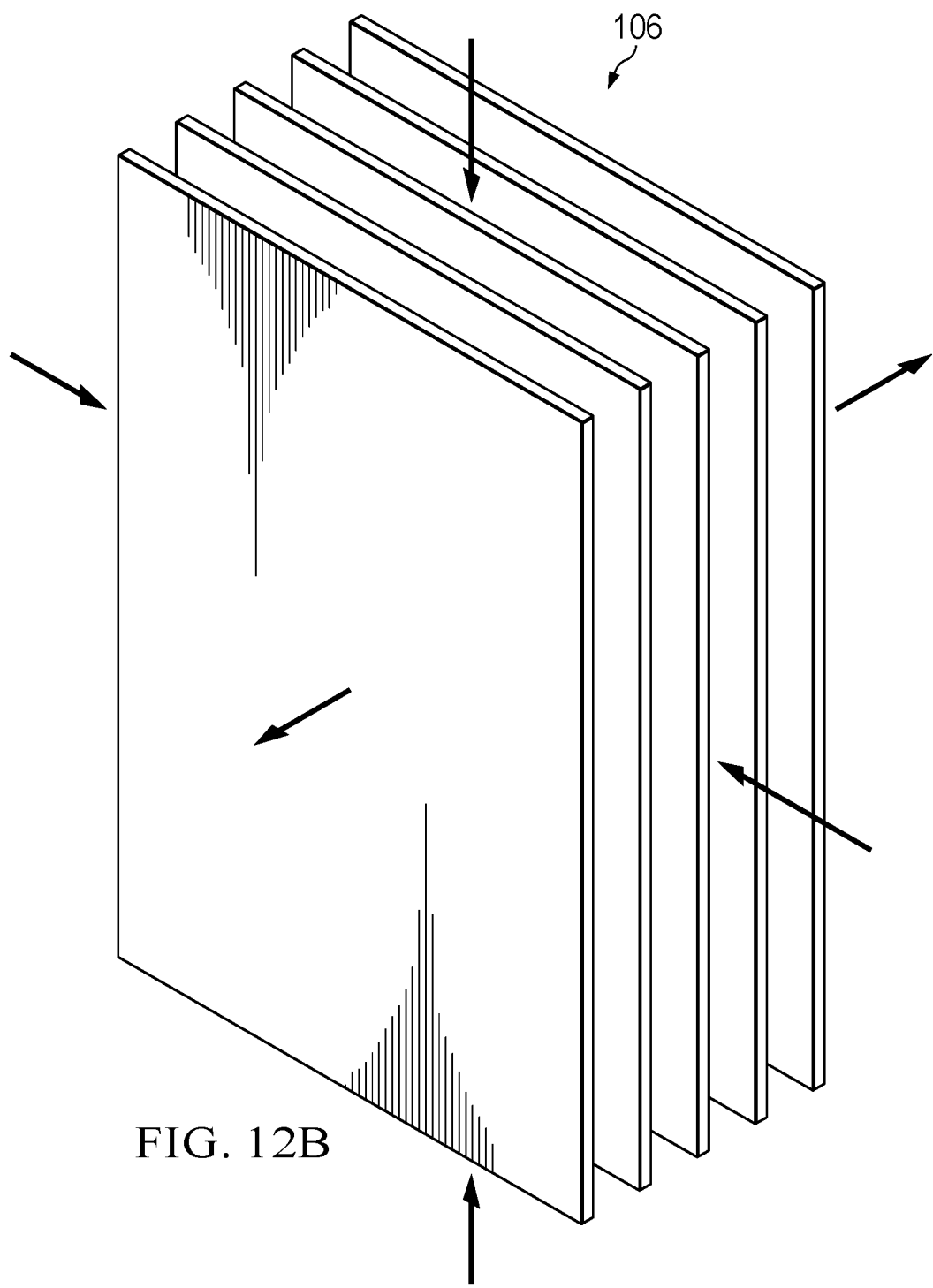

Turning to FIGS. 12A and 12B, FIGS. 12A and 12B are simple block diagrams illustrating example details of a battery 102h, in accordance with an embodiment of the present disclosure. As illustrated in FIG. 12A, the battery 102h can include the positive terminal 110, the negative terminal 112, the plurality of inlets 114a and 114c and the plurality of outlets 116b. The battery can include the first side 702, the second side 704, the third side 706, the fourth side 708, the fifth side 710, and the sixth side 712. The plurality of inlets 114a can be located on the first side 702 and the second side 704 of the battery 102h and the plurality of inlets 114c can be located on the fifth side 710 and the sixth side 712 of the battery 102h. The outlets 116b can be located on the third side 706 and the fourth side 708 of the battery 102h. The plurality of inlets 114a and 114c and the plurality of outlets 116b can be positioned such that the flow of the electrolyte (not referenced) is between and through each of the plurality of electrodes 106 in the battery 102h. More specifically, as illustrated in FIG. 12B, the flow direction can be parallel-in and perpendicular-out and from the sides of the battery 102h, relative to the electrodes 106. The number of the inlets 114a and 114c and the number of outlets 116b depends on the battery cell size and capacity.

Figure 13:
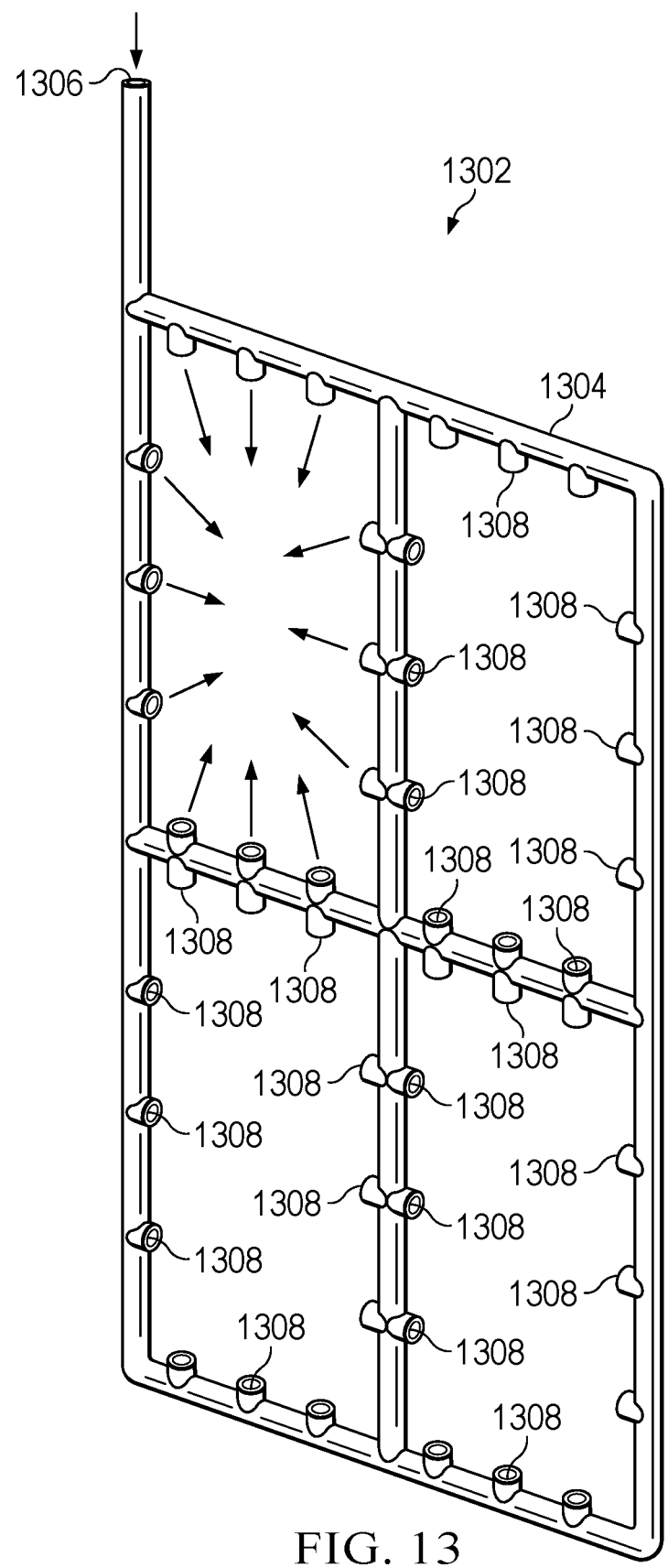
FIG. 13 is a simplified block diagram illustrating example details of a portion of a system to help enable control of an electrolyte inside a battery, in accordance with an embodiment of the present disclosure.

Turning to FIG. 13, FIG. 13 is simple block diagrams illustrating example details of an electrolyte manifold 1302, in accordance with an embodiment of the present disclosure. The electrolyte manifold 1302 can be comprised of hollow tubing 1304 and include one or more inlets 1306 and one or more outlets 1308. The electrolyte (e.g., electrolyte 108) can enter the electrolyte manifold 1302 through the inlet 1306, travel through the hollow tubing 1304 of the electrolyte manifold 1302, and exit through the one or more outlets 1308. The one or more outlets 1308 can be configured to control the direction of flow of the electrolyte as it exits each of the one or more outlets 1308. As illustrated in FIG. 13, the electrolyte manifold 1302 can have a relatively square shaped profile, however, the electrolyte manifold 1302 can have any profile depending on design choice and design constraints.

Figure 14:
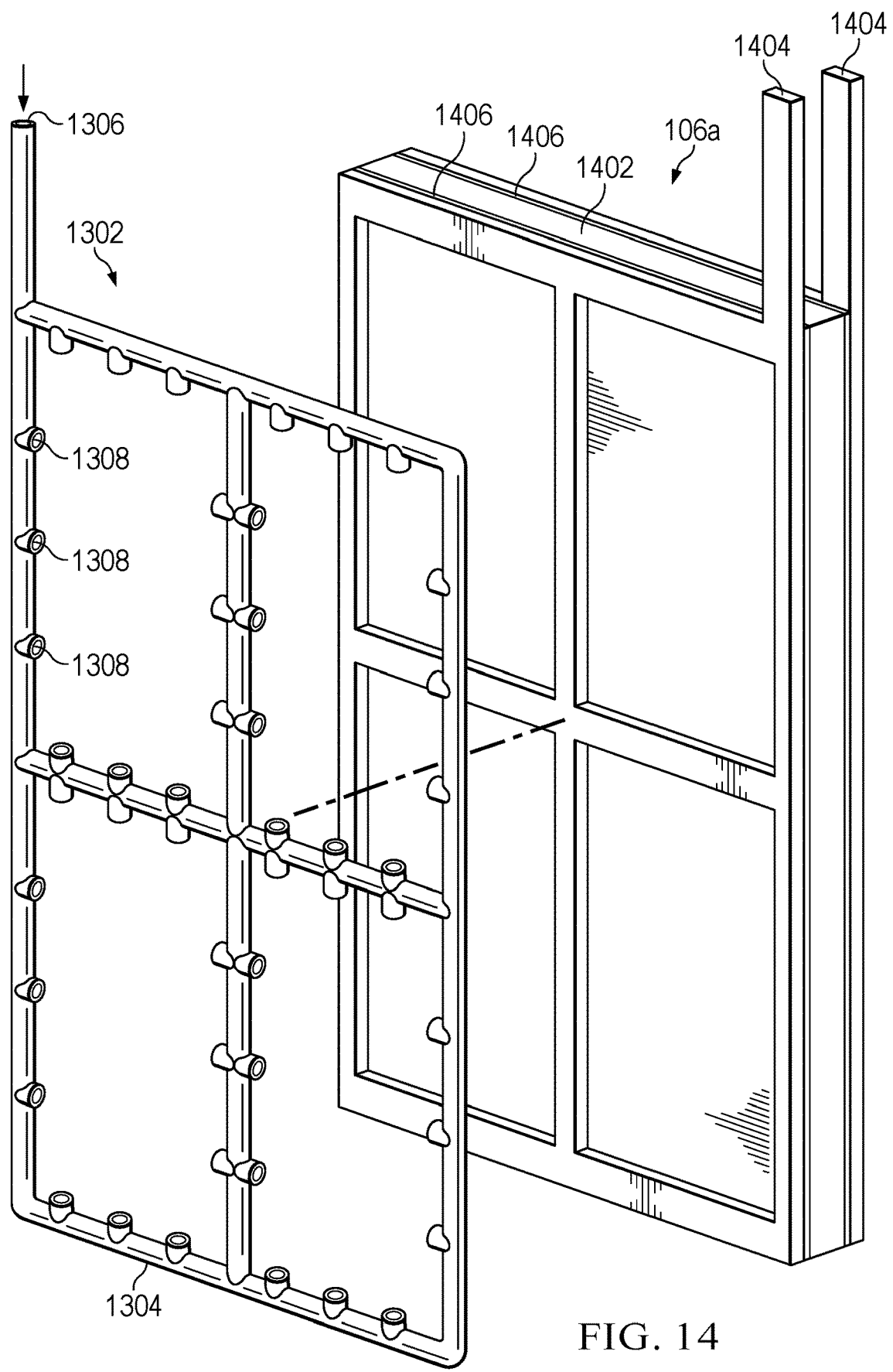
FIG. 14 is a simplified block diagram illustrating example details of a portion of a system to help enable control of an electrolyte inside a battery, in accordance with an embodiment of the present disclosure.

Turning to FIG. 14, FIG. 14 illustrates the electrolyte manifold 1302 being coupled to an electrode 106a, in accordance with an embodiment of the present disclosure. The electrolyte manifold 1002 can be comprised of the hollow tubing 1304 and include the inlets 1306 and the one or more outlets 1308. The electrode 106a can include an electrode substrate 1402 and one or more current collector frames 1404. In some examples, a conductive adhesive 1406 can help to couple the electrode substrate 1402 to the current collector frames 1404. The electrolyte manifold 1302 can have a profile that matches the profile of the electrode 106. Note that the electrolyte manifold 1302 can have a profile that matches the profile of other electrodes 106 than what is shown in FIG. 14, depending on design choice and design configuration.

Figure 15:
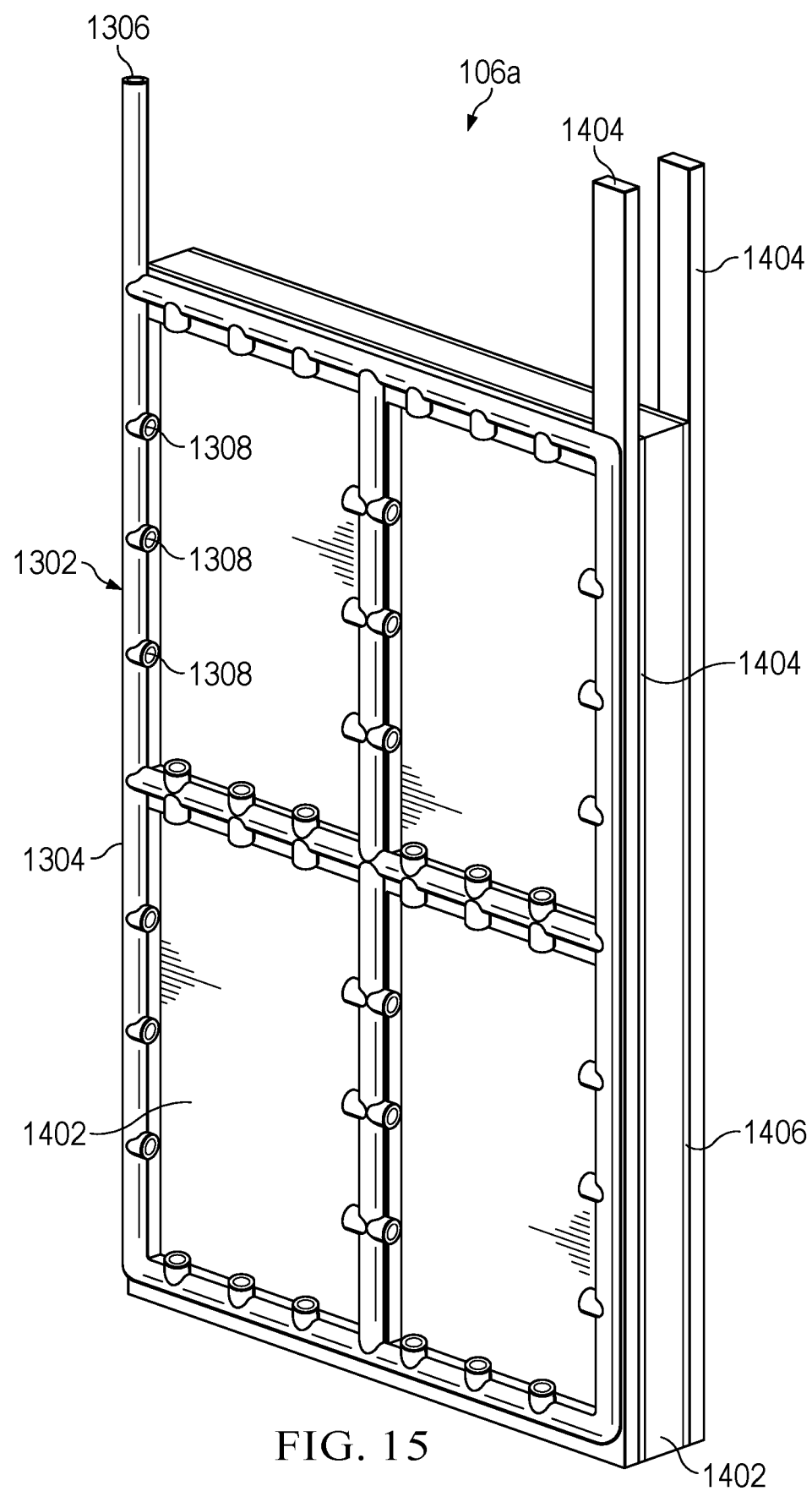
FIG. 15 is a simplified block diagram illustrating example details of a portion of a system to help enable control of an electrolyte inside a battery, in accordance with an embodiment of the present disclosure.

Turning to FIG. 15, FIG. 15 illustrates the electrolyte manifold 1302 coupled to the electrode 106a, in accordance with an embodiment of the present disclosure. The electrolyte manifold 1302 can be comprised of the hollow tubing 1304 and include the one or more inlets 1306 and the one or more outlets 1308. The electrode 106a includes include the electrode substrate 1402 and the current collector frames 1404. In some examples, the conductive adhesive 1406 can help to couple the electrode substrate 1402 to the current collector frames 1404. The electrolyte manifold 1302 can have a profile that matches the profile of the electrode 106a. The electrolyte manifold 1302 can be coupled to the electrode 106a using a water proof glue or some other means of securing the electrolyte manifold 1302 to the electrode 106a.

The electrolyte (e.g., electrolyte 108) can enter the electrolyte manifold 1302 through the inlet 1306, travel through the hollow tubing 1304 of the electrolyte manifold 1302, and exit through the one or more outlets 1308. The one or more outlets 1308 can be configured to control the direction of flow of the electrolyte as it exits each of the one or more outlets 1308 so that the electrolyte is distributed across the electrode substrate 1402.

Figure 16:
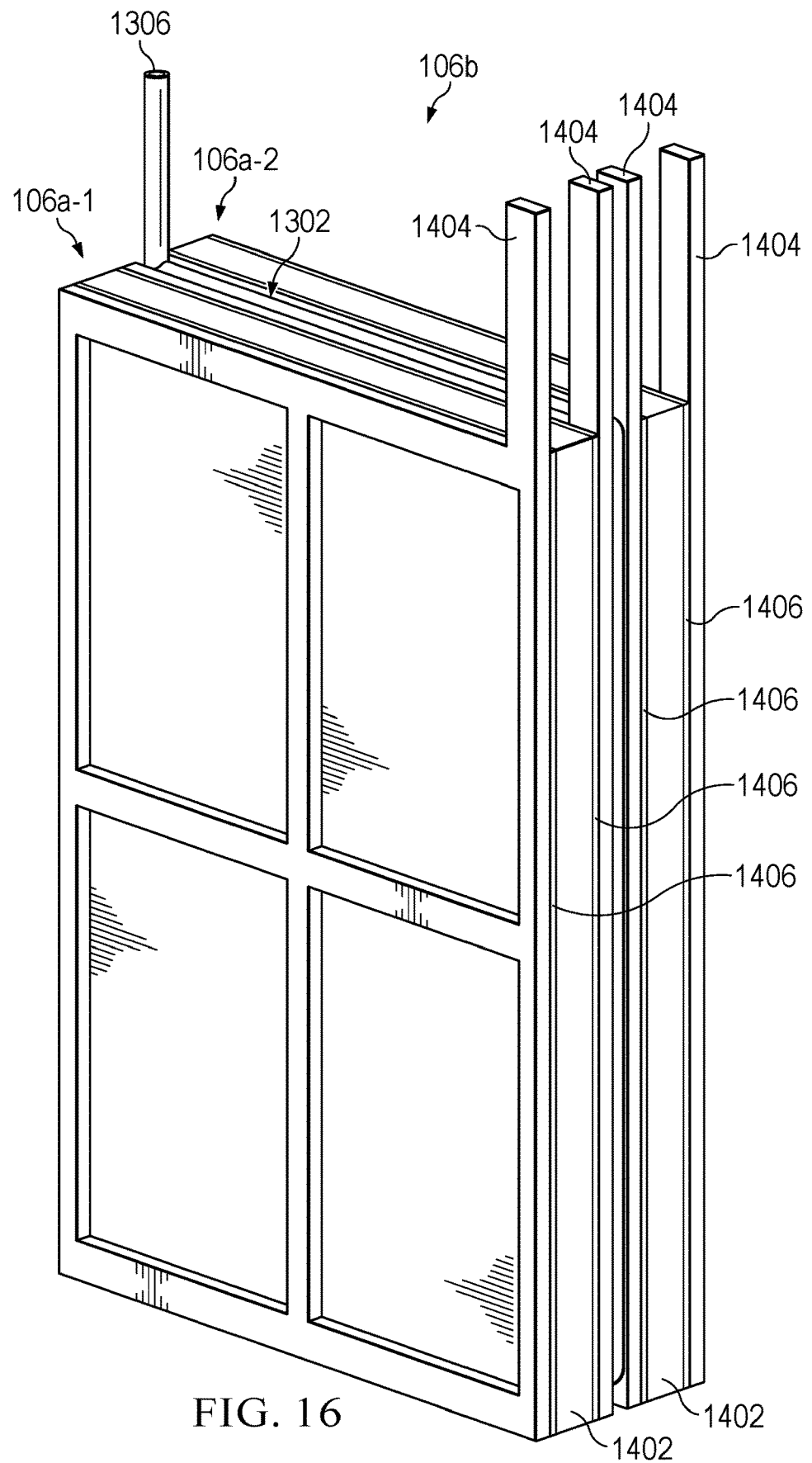
FIG. 16 is a simplified block diagram illustrating example details of a portion of a system to help enable control of an electrolyte inside a battery, in accordance with an embodiment of the present disclosure.

Turning to FIG. 16, FIG. 16 illustrates the electrolyte manifold 1302 coupled to the electrode 106b, in accordance with an embodiment of the present disclosure. The electrode 106b can have a profile that is similar to the electrode 106a illustrated in FIGS. 14 and 15 except with the electrolyte manifold 1302 located in a middle portion of the electrode 106 and is sandwiched between two electrodes 106a. More specifically, a first electrode 106a-1 can be on a first side of the electrolyte manifold 1302 and a second electrode 106a-2 can be on a second side of the electrolyte manifold 1302, where the second side of the electrolyte manifold 1002 is opposite the first side of the electrolyte manifold 1302.

The electrolyte manifold 1302 can be comprised of the hollow tubing 1304 and include the inlet 1306 and the one or more outlets 1308. The electrode 106b includes the electrode substrate 1402 and the current collector frames 1404. In some examples, the conductive adhesive 1406 can help to couple the electrode substrate 1402 to the current collector frames 1404. The electrolyte manifold 1302 can have a profile that matches the profile of the electrode 106b.

The electrolyte (e.g., electrolyte 108) can enter the electrolyte manifold 1302 through the inlet 1306, travel through the hollow tubing 1304 (not referenced) of the electrolyte manifold 1302, and exit through the one or more outlets 1308 (not shown). The one or more outlets 1308 can be configured to control the direction of flow of the electrolyte as it exits each of the one or more outlets 1308 so that the electrolyte is distributed across the electrode substrate 1402 of the electrode electrodes 106e-1 and 106e-2.

Figure 17:
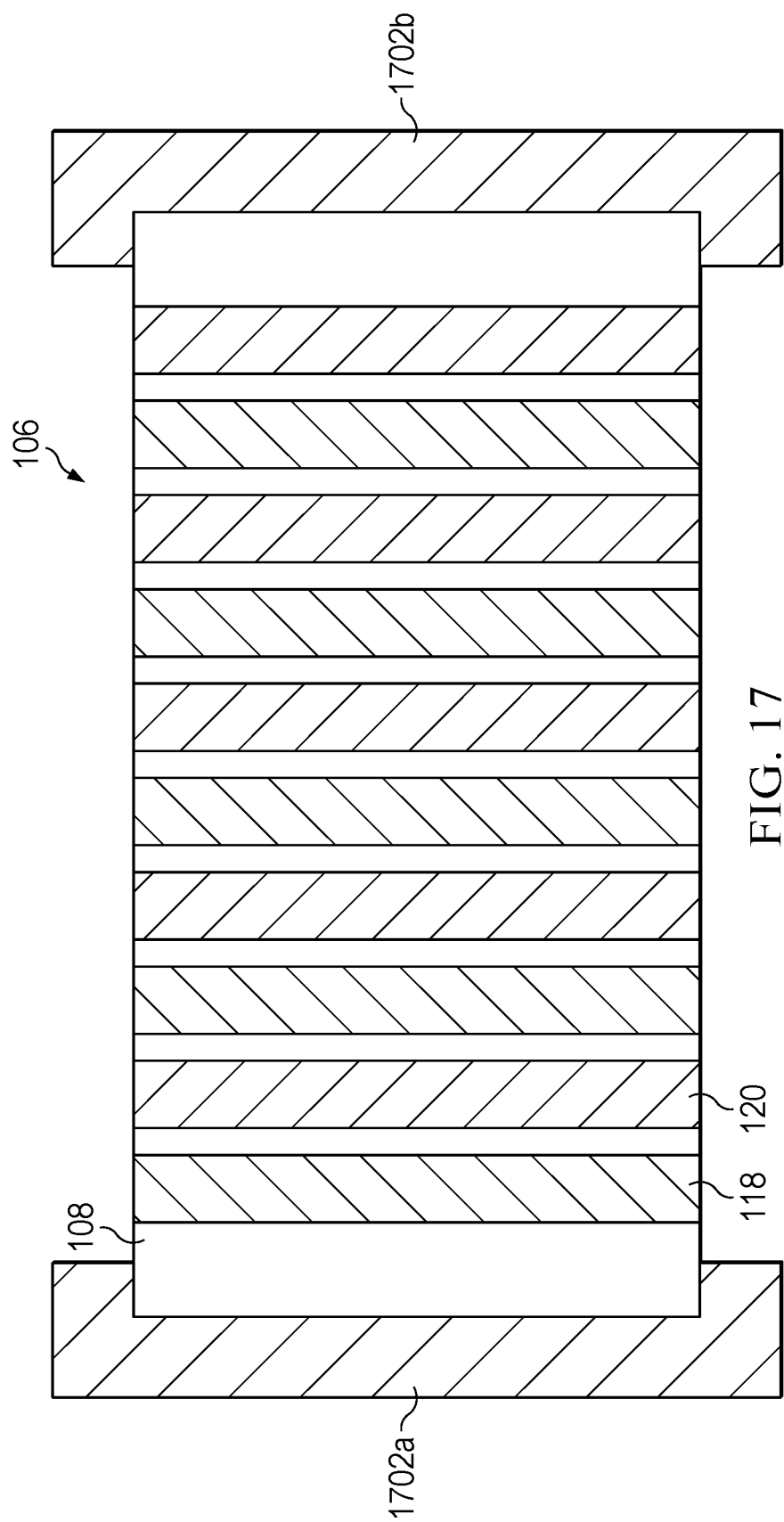
FIG. 17 is a simplified block diagram illustrating example details of a portion of a system to help enable control of an electrolyte inside a battery, in accordance with an embodiment of the present disclosure.

Turning to FIG. 17, FIG. 17 illustrates example details of an electrolyte mover 1702, in accordance with an embodiment of the present disclosure. The plurality of electrodes 106 include at least one anode 118 and at least one cathode 120. The electrolyte mover 1702 can move the electrolyte 108 across the plurality of electrodes 106. More specifically, the electrolyte mover 1702 may be an electrical field generator, magnetic field generator, or thermal field generator and include a first electrolyte mover portion 1702a and a second electrolyte mover portion 1702b. With the generator functioning, the electric, magnetic, or thermal field within the electrolyte is varied to help improve the ion kinetics. This can lead to the facilitated ion diffusion and higher battery kinetics. For example, two magnets can be placed at 1702a and 1702b, respectively. By rotating the magnets, the magnetic field in-between can be controlled to affect ion kinetics due to their response to the changing field.

Figure 18:
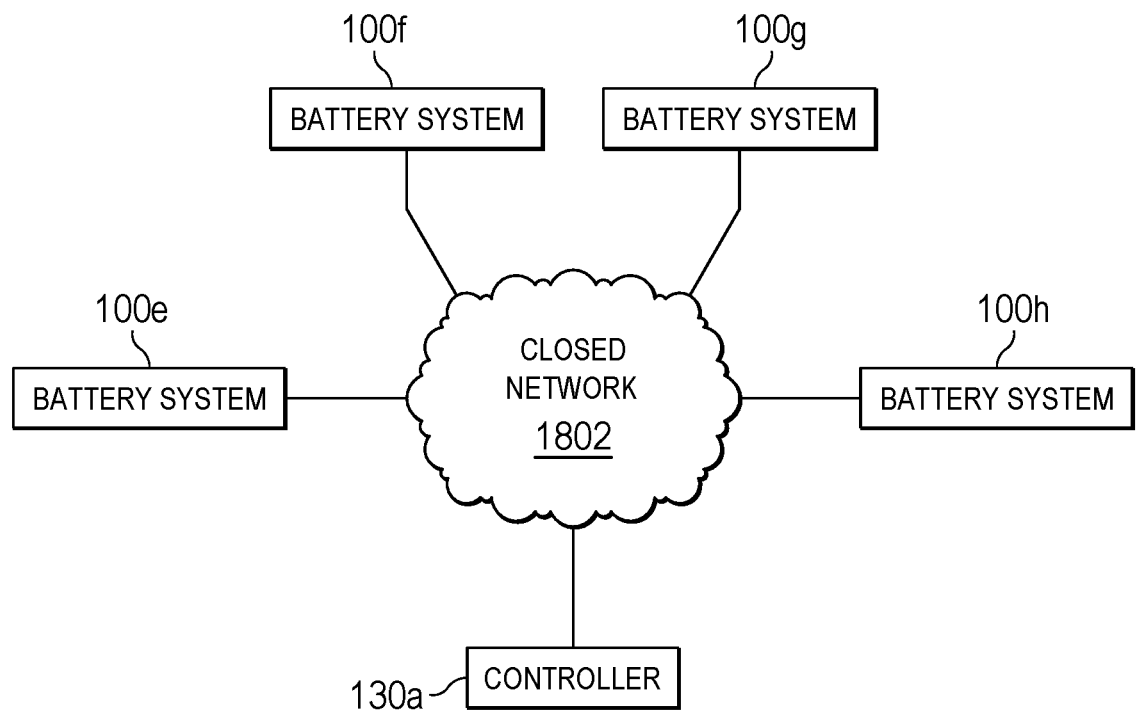
FIG. 18 is a simplified block diagram illustrating example details of a system to help enable control of an electrolyte inside a battery, in accordance with an embodiment of the present disclosure.

Turning to FIG. 18, FIG. 18 illustrates example details of a plurality of battery systems 100 being controlled by a single battery electrolyte controller 130a using a closed network 1802, in accordance with an embodiment of the present disclosure. More specifically, the battery electrolyte controller 130a can be located in a central office and monitor and control the battery systems 100e-100h. Each of battery systems 100e-100h may be part of a physically separates solar or wind farm (e.g., the solar or wind farms are miles apart). The closed network 1802 can be a private network that is not directly interoperable with other standards-based networks (e.g., the Internet). The closed network 1802 also enables communications among different battery modules, packs, systems to coordinate with each other for coordinated energy input and output.

The closed network 1802 represents a series of points or nodes of interconnected communication paths for receiving and transmitting packets of information. The closed network 1802 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

Figure 19:
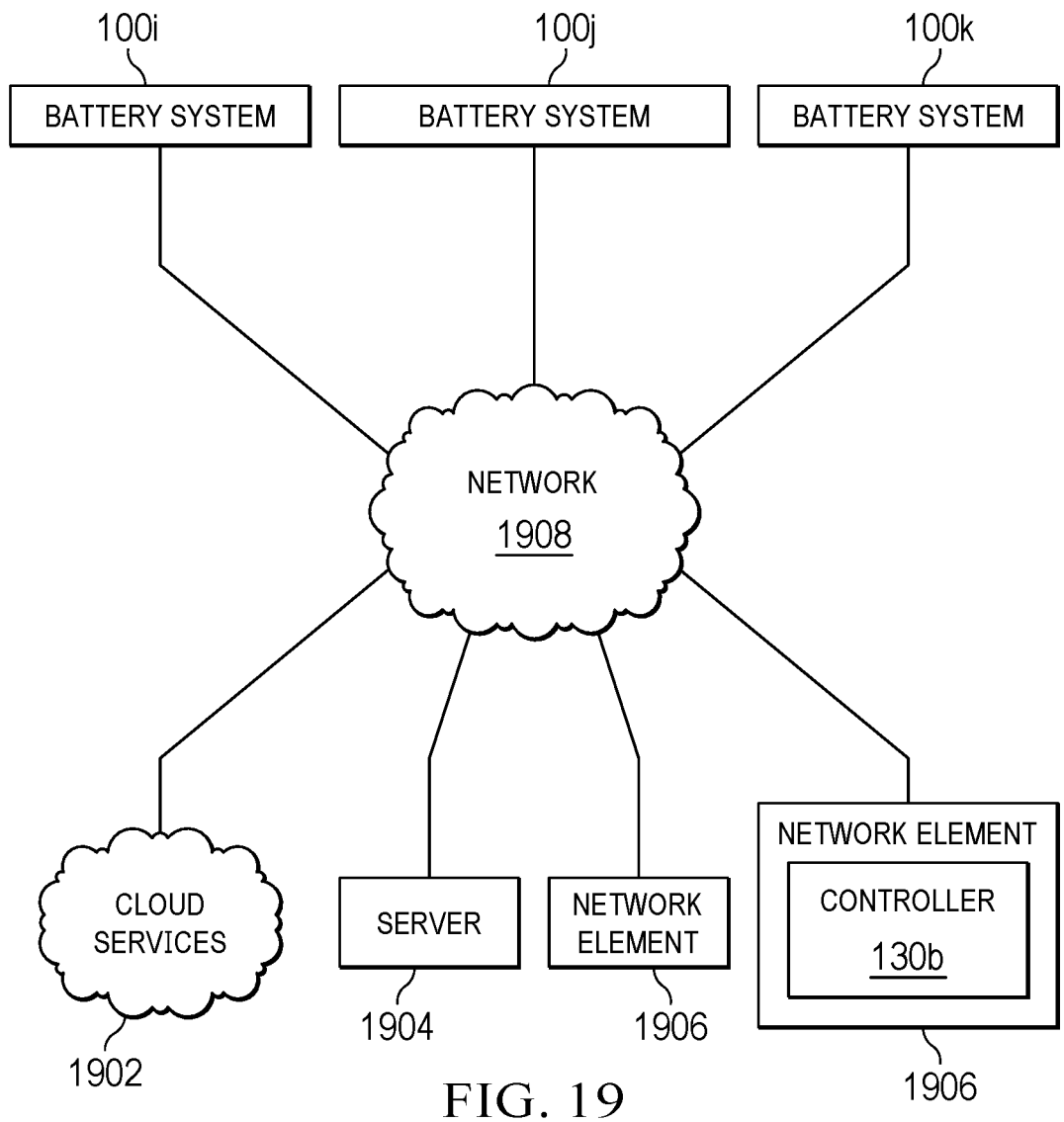
FIG. 19 is a simplified block diagram illustrating example details of a system to help enable control of an electrolyte inside a battery, in accordance with an embodiment of the present disclosure.

Turning to FIG. 19, FIG. 19 illustrates example details of a plurality of battery systems 100 being controlled by a single battery electrolyte controller 130b using a network 1908, in accordance with an embodiment of the present disclosure. More specifically, the battery electrolyte controller 130b can be located in a network element 1906 that is connected to the network 1908 (e.g., the Internet) to monitor and control the battery systems 100e-100h. Each of battery systems 100e-100h may be part of a physically separate solar or wind farm. In some examples, each of the battery systems 100e-100h may be in communication with cloud services 1902, a server 1904 and/or one or more network elements 1906 using the network 1908. The battery electrolyte controller 130b can be located in the cloud services 1902, the server 1904, or the network element 1906 (e.g., as illustrated in FIG. 19). The network 1908 also enables communications among different battery modules, packs, systems to coordinate with each other for coordinated energy input and output. The network 1908 also enables communications between battery and grid, solar farm, wind farm, end-users such as residential building, manufacturing plants, commercial building to charge and discharge the battery system based on the power input and output conditions and needs.

The network 1908 represents a series of points or nodes of interconnected communication paths for receiving and transmitting packets of information. The network 1908 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the network 1908, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

Figure 20:
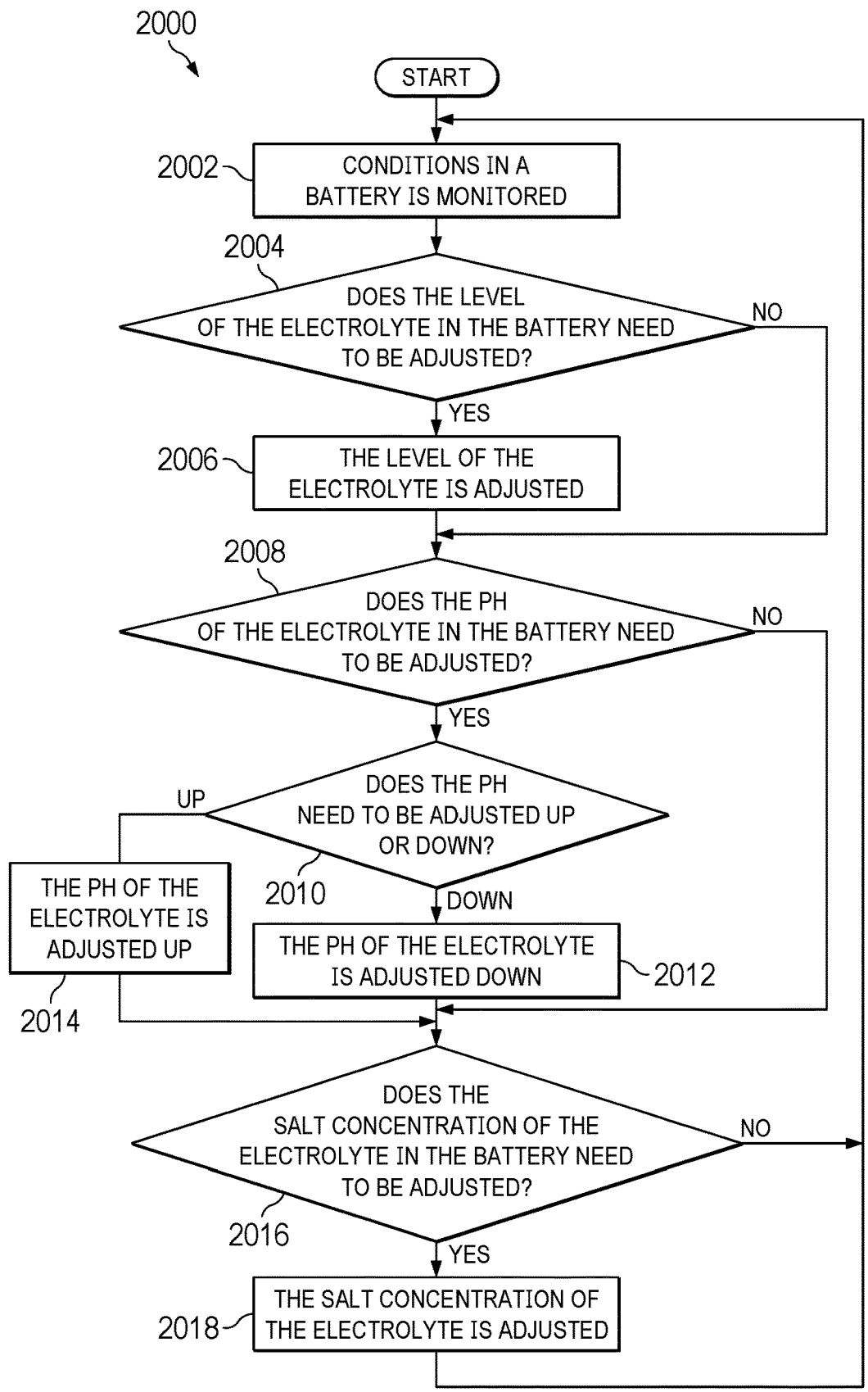
FIG. 20 is a simplified flowchart illustrating potential operations that may be associated with the system in accordance with an embodiment of the present disclosure.

Turning to FIG. 20, FIG. 20 is an example flowchart illustrating possible operations of a flow 2000 that may be associated with enabling an electrolyte control system, in accordance with an embodiment. In an embodiment, one or more operations of flow 2000 may be performed by the battery electrolyte controller 130, the battery electrolyte controller 130a, the battery conditions analysis engine 502, the pump control engine 504, the pH control engine 506, the salt concentration control engine 508 and the liquid level control engine 510. At 2002, conditions in a battery are monitored. For example, the battery conditions analysis engine 502 in the battery electrolyte controller 130 can be configured to analyze the conditions of a battery (e.g., battery 102). At 2004, the system determines if the level of electrolyte in the battery needs to be adjusted. For example, the liquid level control engine 510 in the battery electrolyte controller 130 can be configured to determine if the level of the electrolyte in the battery should be raised or lowered. If the system determines the level of the electrolyte in the battery needs to be adjusted, then the level of the electrolyte in the battery is adjusted, as in 2006, and the system determines if the pH level of the electrolyte in the battery needs to be adjusted, as in 2008. For example, the liquid level control engine 510 can send a signal to the electrolyte reservoir 208 to cause electrolyte to be added to the electrolyte conduit 126 and the pump 128 can be activated to push the added electrolyte 108 to the battery 102 to raise the level of the electrolyte 108 in the battery 102.

If the system determines the level of the electrolyte in the battery does not need to be adjusted, then the system determines if the pH level of the electrolyte in the battery needs to be adjusted, as in 2008. For example, the pH control engine 506 in the battery electrolyte controller 130 can be configured to determine if the pH of the electrolyte should be raised or lowered. If the system determines the pH of the electrolyte in the battery needs to be adjusted, then the system determines if the pH of the electrolyte in the battery needs to be adjusted up or down, as in 2010. If the system determines the pH of the electrolyte in the battery needs to be adjusted down, then the pH of the electrolyte in the battery is adjusted down, as in 2012, and the system determines is the salt concentration of the electrolyte in the battery needs to be adjusted, as in 2016. For example, the pH control engine 506 can send a signal to the pH adjustment reservoir 204 to cause material to be added to the electrolyte in the electrolyte conduit 126 to lower the pH of the electrolyte 108 and the pump control engine 504 can activate the pump 128 to push the electrolyte 108 with the material to lower the pH into the battery 102. If the system determines the pH of the electrolyte in the battery needs to be adjusted up, then the pH of the electrolyte in the battery is adjusted up, as in 2014 and the system determines is the salt concentration of the electrolyte in the battery needs to be adjusted, as in 2016. For example, the pH control engine 506 can send a signal to the pH adjustment reservoir 204 to cause material to be added to the electrolyte in the electrolyte conduit 126 to raise the pH of the electrolyte 108 and the pump control engine 504 can activate the pump 128 to push the electrolyte 108 with the material to raise the pH into the battery 102.

If the system determines that the pH of the electrolyte in the battery does not need to be adjusted, then the system determines is the salt concentration of the electrolyte in the battery needs to be adjusted, as in 2016. For example, the salt concentration control engine 508 in the battery electrolyte controller 130 can be configured to determine if the salt concentration of the electrolyte should be raised or lowered. If the system determines the salt concentration of the electrolyte in the battery needs to be adjusted, then the salt concentration of the electrolyte in the battery is adjusted, as in 2018, and the system returns to 2002 and again the conditions in the battery are monitored. For example, the salt concentration control engine 508 can send a signal to the salt concentration reservoir 206 to cause material to be added to the electrolyte 108 in the electrolyte conduit 126 to raise or lower the salt concentration of the electrolyte 108 and the pump control engine 504 can activate the pump 128 to push the electrolyte 108 with the material to raise or lower the salt concentration into the battery 102. If the system determines the salt concentration of the electrolyte in the battery does not need to be adjusted, then the system returns to 2002 and again the conditions in the battery are monitored.

Figure 21:
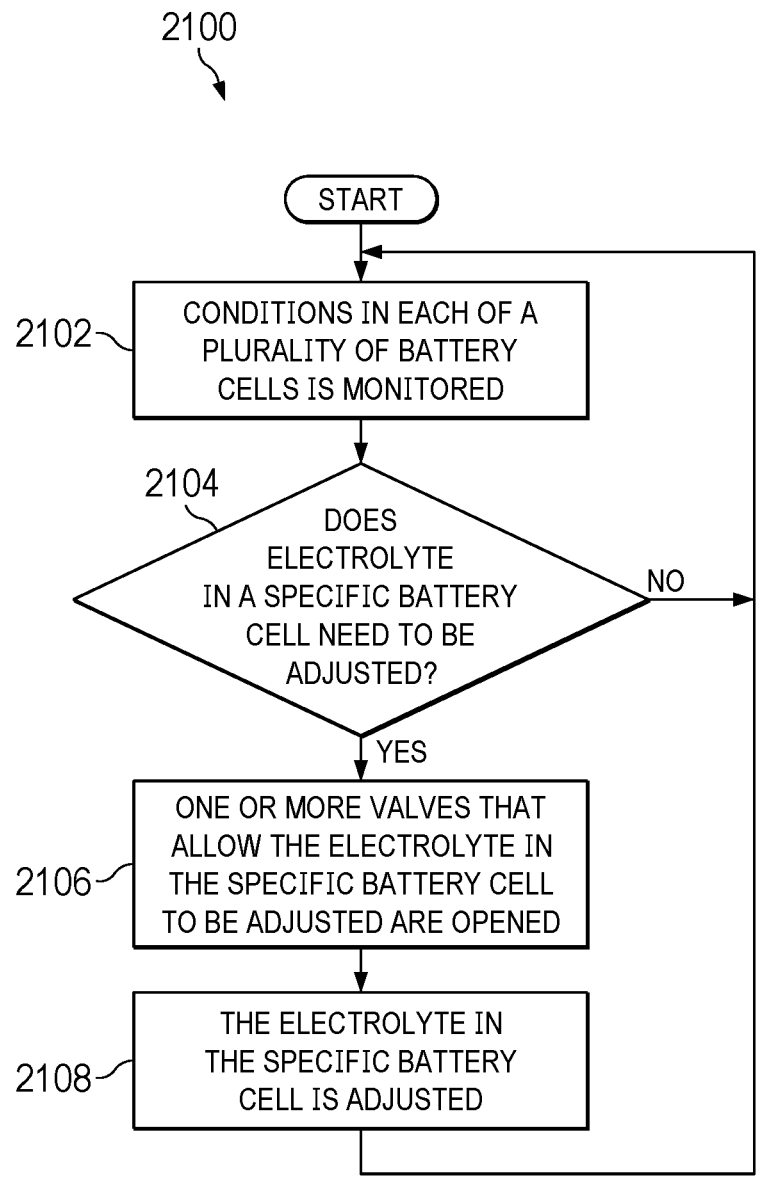
FIG. 21 is a simplified flowchart illustrating potential operations that may be associated with the system in accordance with an embodiment of the present disclosure.

Turning to FIG. 21, FIG. 21 is an example flowchart illustrating possible operations of a flow 2100 that may be associated with enabling an electrolyte control system, in accordance with an embodiment. In an embodiment, one or more operations of flow 2100 may be performed by the battery electrolyte controller 130, the battery electrolyte controller 130a, the battery conditions analysis engine 502, the pump control engine 504, the pH control engine 506, the salt concentration control engine 508 and the liquid level control engine 510. At 2102, conditions in each of a plurality of battery cells is monitored. At 2104, the system determines if electrolyte a specific battery cell needs to be adjusted. If the electrolyte in a specific battery cell does not need to be adjusted, then the system returns to 2102 and again, the conditions in each of the plurality of battery cells is monitored. If the electrolyte in a specific battery cell does need to be adjusted, then one or more valves that allow the electrolyte in the specific battery cell to be adjusted are opened, as in 2106. At 2108, the electrolyte in the specific battery cell is adjusted.

In an example implementation, the battery electrolyte controllers 130, 130a, and 130b are meant to encompass a computer or other device that control the conditions and/or the electrolyte inside a battery and/or a battery system. Each of the battery electrolyte controllers 130, 130a, and 130b may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of the battery electrolyte controllers 130, 130a, and 130b may include virtual elements.

In regards to the internal structure, each of the battery electrolyte controllers 130, 130a, and 130b can include memory elements for storing information to be used in operations. Each of the battery electrolyte controllers 130, 130a, and 130b may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received could be provided in any database, register, queue, table, cache, control list, or other storage structure, all of which can be referenced at any suitable timeframe. Any such storage options may also be included within the broad term 'memory element' as used herein.

In certain example implementations, the functions discussed herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for operations. This includes the memory elements being able to store software, logic, code, or processor instructions that are executed to carry out operations or activities.

In an example implementation, elements of the battery electrolyte controllers 130, 130a, and 130b may include software modules to achieve, or to foster, operations. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of the battery electrolyte controllers 130, 130a, and 130b can include one or more processors that can execute software or an algorithm. In one example, the processors could transform an element or an article (e.g., data) from one state or thing to another state or thing. In another example, activities may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on or over a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

It is also important to note that the preceding diagrams illustrate only some of the possible scenarios and patterns that may be executed by, or within, the battery electrolyte controller 130 and battery electrolyte controller 130a. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. Substantial flexibility is provided by the battery systems 100 and 100a-100h, battery electrolyte controller 130, and battery electrolyte controller 130a in that any suitable arrangements, chronologies, configurations, and timing mechanisms may be provided without departing from the teachings of the present disclosure.

Note that with the examples provided herein, interaction may be described in terms of one, two, three, or more elements. However, this has been done for purposes of clarity and example only. In certain cases, it may be easier to describe one or more of the functionalities by only referencing a limited number of elements. It should be appreciated that the battery systems 100 and 100a-100h, battery electrolyte controller 130, and battery electrolyte controller 130a and their teachings are readily scalable and can accommodate a large number of components, as well as more complicated/sophisticated arrangements and configurations. Accordingly, the examples provided should not limit the scope or inhibit the broad teachings of the battery systems 100 and 100a-100h, battery electrolyte controller 130, and battery electrolyte controller 130a and as potentially applied to a myriad of other architectures.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although the battery systems 100 and 100a-100h, battery electrolyte controller 130, and battery electrolyte controller 130a have been illustrated with reference to particular elements and operations, these elements and operations may be replaced by any suitable architecture, protocols, and/or processes that achieve the intended functionality of the battery systems 100 and 100a-100h, battery electrolyte controller 130, and battery electrolyte controller 130a.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example A1, a battery system to enable control of an electrolyte inside a battery, the battery system can include a battery, where the battery includes a plurality of electrodes, the electrolyte, at least one inlet, and at least one outlet. The system also includes an electrolyte conduit coupled to the at least one inlet and the at least one outlet, a pump coupled to the electrolyte conduit to move the electrolyte through the electrolyte conduit, and a battery electrolyte controller coupled to the electrolyte conduit and the pump, wherein the battery electrolyte controller can add electrolyte to the electrolyte conduit and can activate the pump to push the added electrolyte in the electrolyte conduit to the battery.

In Example A2, the subject matter of Example A1 can optionally include where the battery electrolyte controller is coupled to positive and negative terminals of the battery, monitors one or more conditions related to the battery, and adjusts one or more properties of the electrolyte based on the monitored one or more conditions related to the battery.

In Example A3, the subject matter of Example A1 can optionally include a pH adjustment reservoir, wherein the battery electrolyte controller can use material in the pH adjustment reservoir to adjust a pH of the electrolyte in the electrolyte conduit and can activate the pump to push the electrolyte with the adjusted pH in the electrolyte conduit to the battery.

In Example A4, the subject matter of Example A1 can optionally include a salt concentration reservoir, wherein the battery electrolyte controller can use material in the salt concentration reservoir to adjust a salt concentration of the electrolyte in the electrolyte conduit and can activate the pump to push the electrolyte with the adjusted salt concentration in the electrolyte conduit to the battery.

In Example A5, the subject matter of Example A1 can optionally include where the battery also includes an electrolyte level sensor.

In Example A6, the subject matter of Example A1 can optionally include where the battery also includes an electrolyte pH level sensor.

In Example A7, the subject matter of Example A1 can optionally include where the battery also includes an electrolyte salt concentration sensor.

In Example A8, the subject matter of Example A1 can optionally include where the battery is an aqueous rechargeable battery.

In Example A9, the subject matter of any one of Examples A1-A2 can optionally include a pH adjustment reservoir, wherein the battery electrolyte controller can use material in the pH adjustment reservoir to adjust a pH of the electrolyte in the electrolyte conduit and can activate the pump to push the electrolyte with the adjusted pH in the electrolyte conduit to the battery.

In Example A10, the subject matter of any one of Examples A1-A3 can optionally include a salt concentration reservoir, wherein the battery electrolyte controller can use material in the salt concentration reservoir to adjust a salt concentration of the electrolyte in the electrolyte conduit and can activate the pump to push the electrolyte with the adjusted salt concentration in the electrolyte conduit to the battery.

In Example A11, the subject matter of any one of Examples A1-A4 can optionally include where the battery also includes an electrolyte level sensor.

In Example A12, the subject matter of any one of Examples A1-A5 can optionally include where the battery also includes an electrolyte pH level sensor.

In Example A13, the subject matter of any one of Examples A1-A6 can optionally include where the battery also includes an electrolyte salt concentration sensor.

In Example A14, the subject matter of any one of Examples A1-A7 can optionally include where the battery is an aqueous rechargeable battery.

Example M1 is a method including monitoring one or more condition of a battery using a battery electrolyte controller that is separate from the battery, adjusting one or more properties of an electrolyte in an electrolyte conduit, wherein the electrolyte conduit is coupled to an inlet and an outlet on the battery, and activating a pump to move the electrolyte with the adjusted one or more properties into the battery.

In Example M2, the subject matter of Example M1 can optionally include where the battery electrolyte controller is coupled to positive and negative terminals of the battery to monitor at least one of the one or more conditions of the battery.

In Example M3, the subject matter of Example M1 can optionally include where the one or more properties of the electrolyte are adjusted by increasing a pH of the electrolyte in the electrolyte conduit.

In Example M4, the subject matter of Example M1 can optionally include where the one or more properties of the electrolyte are adjusted by increasing a salt concentration of the electrolyte in the electrolyte conduit.

In Example M5, the subject matter of Example M1 can optionally include where the battery includes an electrolyte level sensor that communicates with the battery electrolyte controller to monitor a level of the electrolyte in the battery.

In Example M6, the subject matter of Example M1 can optionally include where the battery is an aqueous rechargeable battery zinc (Zn) ion battery.

In Example M7, the subject matter of any one of the Examples M1-M2 can optionally include where the one or more properties of the electrolyte are adjusted by increasing a pH of the electrolyte in the electrolyte conduit.

In Example M8, the subject matter of any one of the Examples M1-M3 can optionally include where the one or more properties of the electrolyte are adjusted by increasing a salt concentration of the electrolyte in the electrolyte conduit.

In Example M9, the subject matter of any one of the Examples M1-M4 can optionally include where the battery includes an electrolyte level sensor that communicates with the battery electrolyte controller to monitor a level of the electrolyte in the battery.

In Example M10, the subject matter of any one of the Examples M1-M5 can optionally include where the battery is an aqueous rechargeable battery zinc (Zn) ion battery.

Example AA1 is battery including a plurality of electrodes, an electrolyte, at least one inlet, and at least one outlet, wherein the inlet and the outlet are coupled to an electrolyte conduit to allow new electrolyte to be added to the battery.

In Example AA2, the subject matter of Example AA1 can optionally include where the new electrolyte added to the battery increases a level of the electrolyte in the battery.

In Example AA3, the subject matter of Example AA1 can optionally include where the new electrolyte added to the battery increases a pH level of the electrolyte in the battery.

In Example AA4, the subject matter of Example AA1 can optionally include where the new electrolyte added to the battery increases a salt concentration of the electrolyte in the battery.

In Example AA5, the subject matter of Example AA1 can optionally include an electrolyte level sensor.

In Example AA6, the subject matter of Example AA1 can optionally include where the battery is an aqueous rechargeable battery.

In Example AA7, the subject matter of any one of Examples AA1-AA2 can optionally include where the new electrolyte added to the battery increases a pH level of the electrolyte in the battery.

In Example AA8, the subject matter of any one of Examples AA1-AA3 can optionally include where the new electrolyte added to the battery increases a salt concentration of the electrolyte in the battery.

In Example AA9, the subject matter of any one of Examples AA1-AA4 can optionally include an electrolyte level sensor.

In Example AA10, the subject matter of any one of Examples AA1-AA5 can optionally include where the battery is an aqueous rechargeable battery.

Example S1 is a system to enable control of an electrolyte inside a battery. The system can include means for monitoring one or more condition of a battery using a battery electrolyte controller that is separate from the battery, adjusting one or more properties of an electrolyte in an electrolyte conduit, wherein the electrolyte conduit is coupled to an inlet and an outlet on the battery and means for activating a pump to move the electrolyte with the adjusted one or more properties into the battery.

In Example S2, the subject matter of Example S1 can optionally include where the battery electrolyte controller is coupled to positive and negative terminals of the battery to monitor at least one of the one or more conditions of the battery.

In Example S3, the subject matter of Example S1 can optionally include where the one or more properties of the electrolyte are adjusted by increasing a pH of the electrolyte in the electrolyte conduit.

In Example S4, the subject matter of Example S1 can optionally include where the one or more properties of the electrolyte are adjusted by increasing a salt concentration of the electrolyte in the electrolyte conduit.

In Example S5, the subject matter of Example S1 can optionally include where the battery includes an electrolyte level sensor that communicates with the battery electrolyte controller to monitor a level of the electrolyte in the battery.

In Example S6, the subject matter of Example S1 can optionally include where the battery is an aqueous rechargeable battery zinc (Zn) ion battery.

In Example S7, the subject matter of any one of the Examples S1-S2 can optionally include where the one or more properties of the electrolyte are adjusted by increasing a pH of the electrolyte in the electrolyte conduit.

In Example S8, the subject matter of any one of the Examples S1-S3 can optionally include where the one or more properties of the electrolyte are adjusted by increasing a salt concentration of the electrolyte in the electrolyte conduit.

In Example S9, the subject matter of any one of the Examples S1-S4 can optionally include where the battery includes an electrolyte level sensor that communicates with the battery electrolyte controller to monitor a level of the electrolyte in the battery.

In Example S10, the subject matter of any one of the Examples S1-S5 can optionally include where the battery is an aqueous rechargeable battery zinc (Zn) ion battery.

Example X1 is a machine-readable storage medium including machine-readable instructions to implement a method or realize an apparatus as in any one of the Examples M1-M10 or S1-S10. Example Y1 is an apparatus comprising means for performing any of the Example methods M1-M10. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A battery system to enable control of an electrolyte inside a battery, the battery system comprising:
   a rechargeable battery that is not a metal-air battery, wherein the battery includes:
     a plurality of electrodes;
     the electrolyte;
     at least one inlet; and
     at least one outlet;
   an electrolyte conduit coupled to the at least one inlet and the at least one outlet;
   a pump coupled to the electrolyte conduit to circulate the electrolyte through the electrolyte conduit and the battery when the battery is in use;
   a battery electrolyte controller coupled to the electrolyte conduit and the pump, wherein the battery electrolyte controller can add electrolyte to the electrolyte conduit and can activate the pump to push the added electrolyte in the electrolyte conduit to the battery;
   a pH adjustment reservoir, wherein the battery electrolyte controller can use an acid or base in the pH adjustment reservoir to adjust a pH of the electrolyte in the electrolyte conduit and the battery electrolyte controller can activate the pump to push the electrolyte with the adjusted pH in the electrolyte conduit to the battery; and
   a salt concentration reservoir, wherein the battery electrolyte controller can use material in the salt concentration reservoir to adjust a salt concentration of the electrolyte in the electrolyte conduit and the battery electrolyte controller can activate the pump to push the electrolyte with the adjusted salt concentration in the electrolyte conduit to the battery, wherein the pH of the electrolyte and the salt concentration of the electrolyte can be adjusted independently of each other.

2. The battery system of claim 1, wherein the battery electrolyte controller is coupled to positive and negative terminals of the battery, monitors one or more conditions related to the battery, and adjusts one or more properties of the electrolyte based on the monitored one or more conditions related to the battery.

3. The battery system of claim 1, wherein the battery also includes an electrolyte level sensor.

4. The battery system of claim 1, wherein the battery also includes an electrolyte pH level sensor.

5. The battery system of claim 1, wherein the battery also includes an electrolyte salt concentration sensor.

6. The battery system of claim 1, wherein the battery is an aqueous rechargeable battery.

\* \* \* \* \*